United States Patent
Venters, III et al.

(10) Patent No.: US 8,286,228 B2
(45) Date of Patent: *Oct. 9, 2012

(54) SECURE STREAMING CONTAINER

(75) Inventors: Carl Vernon Venters, III, Wilmington, NC (US); Eugene B. Phillips, II, Raleigh, NC (US); Seth Ornstein, Silver Spring, MD (US)

(73) Assignee: Digital Reg of Texas, LLC, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/180,946

(22) Filed: Jul. 12, 2011

(65) Prior Publication Data

US 2011/0271113 A1    Nov. 3, 2011

Related U.S. Application Data

(60) Continuation of application No. 11/812,749, filed on Jun. 21, 2007, now Pat. No. 7,987,502, which is a division of application No. 10/798,371, filed on Mar. 12, 2004, now Pat. No. 7,251,832.

(60) Provisional application No. 60/453,950, filed on Mar. 13, 2003.

(51) Int. Cl.
 *H04L 9/32* (2006.01)
 *H04K 1/00* (2006.01)
 *H04N 7/16* (2011.01)
 *G06Q 99/00* (2006.01)

(52) U.S. Cl. ............. 726/9; 726/20; 726/26; 713/168; 713/194; 705/51; 380/255

(58) Field of Classification Search .............. None
See application file for complete search history.

(56) References Cited

U.S. PATENT DOCUMENTS 4,471,163 A    9/1984  Donald et al.
4,528,643 A    7/1985  Freeny
(Continued)

FOREIGN PATENT DOCUMENTS

CA    2 220 457    5/1998
(Continued)

OTHER PUBLICATIONS

Netdox Brochure, "Certified Verified Anytime" (12 pages).
(Continued)

*Primary Examiner* — Christopher Revak
(74) *Attorney, Agent, or Firm* — McGuireWoods, LLP; Charles J. Gross

(57) ABSTRACT

A system and method for securely streaming encrypted digital media content out of a digital container to a user's media player. This streaming occurs after the digital container has been delivered to the user's machine and after the user has been authorized to access the encrypted content. The user's operating system and media player treat the data stream as if it were a being delivered over the Internet (or other network) from a streaming web server. However, no Internet connection is required after the container has been delivered to the user and the data stream suffers no quality loss due to network traffic or web server access problems. In this process of the invention, the encrypted content files are decrypted and fed to the user's media player in real time and are never written to the user's hard drive or storage device. This process makes unauthorized copying of the digital content contained in the digital container virtually impossible.

24 Claims, 20 Drawing Sheets

U.S. PATENT DOCUMENTS

| | | | |
|---|---|---|---|
| 4,558,176 | A | 12/1985 | Arnold et al. |
| 4,658,093 | A | 4/1987 | Hellman |
| 4,683,553 | A | 7/1987 | Mollier |
| 4,796,220 | A | 1/1989 | Wolfe |
| 4,999,806 | A | 3/1991 | Chernow et al. |
| 5,023,907 | A | 6/1991 | Johnson et al. |
| 5,033,084 | A | 7/1991 | Beecher |
| 5,057,935 | A | 10/1991 | Williams |
| 5,191,611 | A | 3/1993 | Lang |
| 5,319,705 | A | 6/1994 | Halter et al. |
| 5,337,357 | A | 8/1994 | Chou et al. |
| 5,598,470 | A | 1/1997 | Cooper et al. |
| 5,615,264 | A | 3/1997 | Kazmierczak et al. |
| 5,629,980 | A | 5/1997 | Stefik et al. |
| 5,671,276 | A | 9/1997 | Eyer et al. |
| 5,671,279 | A | 9/1997 | Elgamal |
| 5,677,953 | A | 10/1997 | Dolphin |
| 5,703,279 | A | 12/1997 | Igura et al. |
| 5,703,951 | A | 12/1997 | Dolphin |
| 5,708,709 | A | 1/1998 | Rose |
| 5,708,780 | A | 1/1998 | Levergood et al. |
| 5,715,314 | A | 2/1998 | Payne et al. |
| 5,724,424 | A | 3/1998 | Gifford |
| 5,765,152 | A | 6/1998 | Erickson |
| 5,778,173 | A | 7/1998 | Apte |
| 5,778,367 | A | 7/1998 | Wesinger, Jr. et al. |
| 5,784,460 | A | 7/1998 | Blumenthal et al. |
| 5,790,664 | A | 8/1998 | Coley et al. |
| 5,790,790 | A | 8/1998 | Smith et al. |
| 5,794,207 | A | 8/1998 | Walker et al. |
| 5,796,952 | A | 8/1998 | Davis et al. |
| 5,889,943 | A | 3/1999 | Ji et al. |
| 5,892,825 | A | 4/1999 | Mages et al. |
| 5,905,860 | A | 5/1999 | Olsen et al. |
| 5,958,005 | A | 9/1999 | Thorne et al. |
| 5,958,051 | A | 9/1999 | Renaud et al. |
| 5,963,915 | A | 10/1999 | Kirsch |
| 6,014,688 | A | 1/2000 | Venkatraman et al. |
| 6,021,491 | A | 2/2000 | Renaud |
| 6,035,329 | A | 3/2000 | Mages et al. |
| 6,055,570 | A | 4/2000 | Nielsen |
| 6,067,526 | A | 5/2000 | Powell |
| 6,073,256 | A | 6/2000 | Sesma |
| 6,075,862 | A | 6/2000 | Yoshida et al. |
| 6,098,056 | A | 8/2000 | Rusnak et al. |
| 6,134,592 | A | 10/2000 | Montulli |
| 6,144,942 | A | 11/2000 | Ruckdashel |
| 6,178,442 | B1 | 1/2001 | Yamazaki |
| 6,192,396 | B1 | 2/2001 | Kohler |
| 6,205,485 | B1 | 3/2001 | Kikinis |
| 6,226,618 | B1 | 5/2001 | Downs et al. |
| 6,253,193 | B1 | 6/2001 | Ginter et al. |
| 6,256,672 | B1 | 7/2001 | Redpath |
| 6,266,692 | B1 | 7/2001 | Greenstein |
| 6,286,103 | B1 | 9/2001 | Maillard et al. |
| 6,288,738 | B1 | 9/2001 | Dureau et al. |
| 6,289,461 | B1 | 9/2001 | Dixon |
| 6,304,897 | B1 | 10/2001 | Venkatraman et al. |
| 6,314,454 | B1 | 11/2001 | Wang et al. |
| 6,332,156 | B1 | 12/2001 | Cho et al. |
| 6,345,256 | B1 | 2/2002 | Milsted et al. |
| 6,385,596 | B1 | 5/2002 | Wiser et al. |
| 6,389,541 | B1 | 5/2002 | Patterson |
| 6,418,421 | B1 | 7/2002 | Hurtado et al. |
| 6,449,719 | B1 | 9/2002 | Baker |
| 6,453,334 | B1 | 9/2002 | Vinson et al. |
| 6,484,156 | B1 | 11/2002 | Gupta et al. |
| 6,574,609 | B1 | 6/2003 | Downs et al. |
| 6,587,837 | B1 | 7/2003 | Spagna et al. |
| 6,684,248 | B1 | 1/2004 | Janacek et al. |
| 6,751,670 | B1 | 6/2004 | Patterson |
| 6,868,403 | B1 | 3/2005 | Wiser et al. |
| 6,920,222 | B1 | 7/2005 | Tsukahara et al. |
| 6,941,459 | B1 | 9/2005 | Hind et al. |
| 6,965,993 | B2 | 11/2005 | Baker |
| 7,036,011 | B2 | 4/2006 | Grimes et al. |
| 7,191,332 | B1 | 3/2007 | Pankajakshan et al. |
| 7,299,292 | B2 * | 11/2007 | Morten et al. ............... 709/231 |
| 7,421,741 | B2 * | 9/2008 | Phillips et al. ............... 726/30 |
| 7,979,697 | B2 * | 7/2011 | Phillips et al. ............... 713/160 |
| 7,987,502 | B2 * | 7/2011 | Venters et al. ............... 726/9 |
| 2003/0046274 | A1 | 3/2003 | Erickson et al. |
| 2003/0126608 | A1 | 7/2003 | Safadi et al. |
| 2003/0131353 | A1 | 7/2003 | Blom et al. |
| 2004/0039834 | A1 | 2/2004 | Saunders et al. |
| 2004/0117500 | A1 | 6/2004 | Lindholm et al. |
| 2005/0021633 | A1 | 1/2005 | Venkatraman et al. |
| 2005/0086501 | A1 | 4/2005 | Woo et al. |
| 2005/0195978 | A1 | 9/2005 | Babic et al. |
| 2005/0278259 | A1 | 12/2005 | Gunaseelan et al. |
| 2006/0095382 | A1 | 5/2006 | Mahlbacker |
| 2006/0123484 | A1 | 6/2006 | Babic et al. |
| 2011/0246774 | A1 * | 10/2011 | Phillips et al. ............... 713/168 |

FOREIGN PATENT DOCUMENTS

| | | |
|---|---|---|
| EP | 0 717 338 | 6/1996 |
| WO | WO 96/27155 | 9/1996 |
| WO | WO 98/30964 | 7/1998 |
| WO | WO 98/58306 | 12/1998 |

OTHER PUBLICATIONS

Netdox Brochure 1997—Doxit Service Overview (5 pages).
Tumbleweed Software, "POSTA"; http://www.posta.com/posta/posta_overview.html, (3 pages).
InterTrust Technology "MetaTrust Overview"; http:www.intertrust.com/technology/tech.html (8 pages).
InterTrust Technologies Corporation: Overview: InterTrust Powers The New Digital Economy, A Piece of the Tick—Version 2.0, Oct. 9, 1998 (38 pages).
Sibert et al., DigiBox: A Self-Protecting Container for Information Commerce, Proceedings of the First USENIX Workshop on Electronic Commerce, New York, Jul. 1995 (14 pages).
Vbox White Paper, http://www.previewsystems.com/products/vbox/whitepaper//white_paper.html, (13 pages).
Overview of Release Software's Services (3 pages).
Setting Up a Web Store: A White Paper for Software Resellers; 1997 Release Software Corp.; pp. 1-17; http://www.releasesoftware.com/whitep/resellerwhitepaper.rft.
Stuffit Deluxe 5.0, Award-winning, industry-standard compression by Aladdin Systems, Sep. 1998.
Stuffit Deluxe 5.0: The Complete Compression Solution; modified Jan. 7, 1999, pp. 1-3; http://www.Aladdinsys.com/deluxe/benefits.html.
WinZip Home Page: Do you have Questions about WinZip? Check our FAQ Page; downloaded Apr. 26, 1999; http://www.winzip.com/ (8 pages).
Setting Up a Web Store: A White Paper for Software Developers and Publishers; 1997 Release Software Corp.; pp. 1-18; http://www.releasesoftware.com/whitep/isvwhitepaper.rtr.
InterTrust Technology; http://www.intertrust.com/technology/tech.html (1 page).
InterTrust Technologies; http://www.intertrust.com/main/technology/rs_howitworks.html (8 pages).
Supplementary European Search Report dated Jan. 17, 2006 (1 page).
Venkatramani et al., "Securing Media for Adaptive Streaming", Nov. 2003, ACM, p. 307-310.
Liu et al., "Digital Rights Management for Content Distribution", 2003, Australian Computer Society, Inc., p. 1-10.
Blanton et al., "Microsoft Press Computer Dictionary", 2002, Microscoft Corporation.
Invitation pursuant to Article 94(3) and Rule 71 (1) EPC issued by the European Patent Office dated Dec. 23, 2011.

* cited by examiner

DIGITALCONTAINERS CREDIT CARD INFORMATION _ ◻ ✕

*REQUIRED FIELD

250 {
*CREDIT CARD NUMBER.. [_____]
*EXPIRATION DATE....... MONTH [__] YEAR [__]
*FIRST NAME........... [_____]
*LAST NAME............ [_____]
*ADDRESS.............. [_____]
*CITY................. [_____]
*STATE................ [__] (EX. VA)
*ZIP.................. [_____]
}
*EMAIL ADDRESS........ [_____]

[ SEND ]

| THE INTERNATIONAL JURIST FROM DIGITALCONTAINERS |

PLEASE SELECT YOUR PURCHASE TYPE

260 {
- ● SINGLE ISSUE - $ 1.25
- ○ ONE MONTH - $ 24.95
- ○ SIX MONTHS - $ 89.95
- ○ ONE YEAR - $ 149.95

265 {
- *CREDIT CARD NUMBER.. 123456789
- *EXPIRATION DATE....... MONTH: 11  YEAR: 02
- *FIRST NAME........... JOHN
- *LAST NAME............ DOE
- *ADDRESS LINE 1........ 1234
- *ADDRESS LINE 2........ SUITE
- *CITY................. WASHINGTON
- *STATE................ DC  (EX. VA)
- *ZIP.................. 12345
- *E-MAIL ADDRESS.......

SEND

(CON'T)

SECURE STREAMING CONTAINER

CROSS-REFERENCE TO RELATED APPLICATIONS

This is a continuation application of U.S. patent application Ser. No. 11/812,749. now granted as U.S. Pat. No. 7,987,502, which is a divisional of U.S. patent application Ser. No. 10/798,371, filed Mar. 12, 2004, now issued as U.S. Pat. No. 7,251,832, which claims benefit of Provisional Application No. 60/453,950, filed on Mar. 13, 2003, the content of which are hereby incorporated by reference in their entirety.

BACKGROUND OF THE INVENTION

1. Field of the Invention

The invention generally relates to a method and apparatus for sending secured digital containers having streaming media content therein over networks to a device. The invention may also provide a method and apparatus for securely streaming the media content from the digital container to a media player residing in the device.

2. Background Description

Distributors of digital content face a growing need to send large audio and video media files to consumers over the Internet. This distribution must be accomplished while providing both copyright protection and insuring payment is made to the content originators.

Traditionally, there have two basic methods available to content distributors and originators to accomplish this feat: a) Encrypted file downloads, and b) file streaming.

Encrypted File Download

This method allows the consumer to download the entire media file before allowing access to the contents. A payment mechanism is usually made available on the world-wide web at the point of file download and the file is typically encrypted in some fashion that provides for decryption on the user's computer upon successful payment and download. Generally, the copyright protection is accomplished by either making the file type proprietary or by utilizing public key encryption methodology.

The proprietary file type method requires the user to download and install a proprietary player prior to successfully playing the media file. In practice, requiring a proprietary media player can limit the audience and overall distribution potential of the file. The proprietary files are also vulnerable to unauthorized conversion to non-proprietary file types.

The public key encryption method requires that the content originator and distributor be part of an elaborate public key infrastructure (PKI) that must be utilized before the user gains access to the file. This PKI system requires the user's media player to successfully interact with public key servers and trusted third party servers. The complexity and costs associated with this system serve to act as inhibiting factors for both consumers and content originators. There is another drawback to this system. Since the media file type is not proprietary, it must sooner or later reside on the user's machine in its unencrypted form in order for the resident media player to successfully gain access to it. This makes it vulnerable to unauthorized copying by knowledgeable users.

File Streaming

This technique avoids unauthorized access problems by never allowing the user access to the entire media file. After successfully executing a payment transaction, the user's media player is typically provided with the Internet Protocol (IP) address of the content provider's streaming file server. Once the media player makes contact with the streaming server, the server begins sending the content file to the user's machine in packet format. This data is read into the media player's buffer, which is typically part of the resident RAM memory on the user's machine. The data is then read from the buffer by the media player, which plays the content of the file for the user. When the amount of data in the buffer becomes low, a request for more packets is sent to the streaming server. In this manner, the entire media file is played for the user as one continuous stream. In theory, the user never experiences any interruption, but in practice disruptions occur.

However, there are problems with the file streaming technique. For example, the content provider must provide the necessary telephony and server infrastructure to make the streaming data available to a large number of simultaneous users. The purchase and maintenance costs of this system can be an onerous burden on the content provider. Also, traffic problems on the network or portions of the network (e.g., local area network (LAN), wide-area network (WAN), telecommunications network, wireless network, cable network, or Internet) may easily lead to interruptions in packet flow to the user's machine and make the playing of the media file intermittent. In addition, to minimize bandwidth demands on the streaming system, the content files are generally compressed as much as possible. These factors can degrade the quality of the user experience.

SUMMARY OF THE INVENTION

In an aspect of the invention, a method of providing streaming content is provided. The method comprises the steps of creating a digital container that includes contents including streaming media content and digital rights management (DRM) and selecting one or more modules for inclusion in the digital container, the selection of the modules being based on one at least one of a type of streaming media content and the DRM. The method further comprises encrypting the streaming media content of the digital container to produce a secured streaming container (SSC) and transmitting the SSC to a target device for access of the SSC from the target device.

In another aspect, a method of receiving electronic data is provided. The method comprises the steps of receiving a secured streaming container (SSC) having streaming media content and accessing the SSC to acquire portions of the streaming media content while other portions of the streaming media content remain secure in the SSC.

In another aspect, a method of creating and accessing streaming content is provided. The method comprises the steps of creating a digital container that includes contents including at least streaming media content and digital rights management (DRM). Further, the method comprises selecting one or more modules for inclusion in the digital container based on one at least one of a type of streaming media content and the DRM and encrypting the streaming media content and optionally the DRM to produce a secured streaming container (SSC). The method also includes accessing the secured streaming container (SSC) using the one or more modules to control playback of the streaming media content.

In another aspect of the invention, a computer program product comprising a computer usable medium having readable program code embodied in the medium is provided. The computer program product includes at least one component to create a digital container that includes contents including streaming media content and digital rights management (DRM) and select one or more modules for inclusion in the digital container wherein the selection of the modules is based on one at least one of a type of streaming media content and the DRM. The component also encrypts streaming media contents of the digital container to produce a secured streaming container (SSC) and transmits the SSC to a target device for access of the SSC from the target device.

In another aspect of the invention, a computer program product comprising a computer usable medium having readable program code embodied in the medium is provided. The computer program product includes at least one component to receive a secured streaming container (SSC) having streaming media content and access the SSC to acquire portions of the streaming media content while other portions of the streaming media content remain secure in the SSC.

In another aspect of the invention, a method of receiving information is provided comprising steps of receiving a secured streaming container (SSC) having streaming media content, accessing the SSC using management controls and playing the streaming media content on a target device wherein the streaming media content by-passes non-volatile memory or persistent storage.

In another aspect of the invention, a streaming media apparatus is provided. The apparatus comprises a means for controlling access to a digital container having streaming media content, a means for securely streaming the streaming media content from the digital container once access is obtained to the digital container, and a means for playing the streaming media content such that one or more segments of the streaming media content are sequentially presented to a media player from the digital container while remaining segments of the streaming media content remain secure in the digital container until sequentially played

BRIEF DESCRIPTION OF THE DRAWINGS

FIGS. 2A-2K are embodiments of graphical user interfaces (GUI), according to the invention;

DETAILED DESCRIPTION OF EMBODIMENTS OF THE INVENTION

The invention relates to a method and apparatus for sending secured digital media content over networks via a secured streaming container (SSC). The SSC of the invention is a digital container that is capable of allowing secure playing of streaming audio and video media files on a wide variety of computing devices and operating systems. The invention may be used to securely deliver a wide range of electronic content that may be presented to a recipient user for access and use such as, for example, music, video, financial transactions, educational materials, sales promotions, hobby information, surveys, confidential data, and the like.

The secured aspect of the invention allows the streaming content to be played without any unauthorized access, copying or other uses. By using the secured streaming container of the invention, it is now also possible to provide playback of such secure streaming media content without any concerns for disruptions or delays that typically results during playback of streaming media across networks.

The SSC combines the best of both the encrypted file download and file streaming techniques to creatively solve the problems inherent in these concepts to thus provide a flexible and secure media file delivery system. The invention provides for managed creation of the secure streaming container that enables the creator to selectively include flexible operational components within the secure streaming container and also provides for subsequent delivery and playback of the media under control of the operational components.

The creation of the secure streaming container may be accomplished with a SSC creation software application. This SSC creation software application may take the form of a "wizard" that guides the container creator through the various selection steps necessary to create a secure streaming container. As the SSC creator progresses through the container creation process by selecting various functions to be included in the streaming container, the container creation software application may select various software code modules to be included in the new container. The creation application ensures that all of the code modules that are required to carry out the selected functions of secured streaming are included in the new container, as directed by the creator of the container. This also ensures that no unnecessary modules are included in the new container in order to keep container size to a minimum. The container creation application enables the container creator to control a large number of specific settings and features of the new container.

Figure 1A:
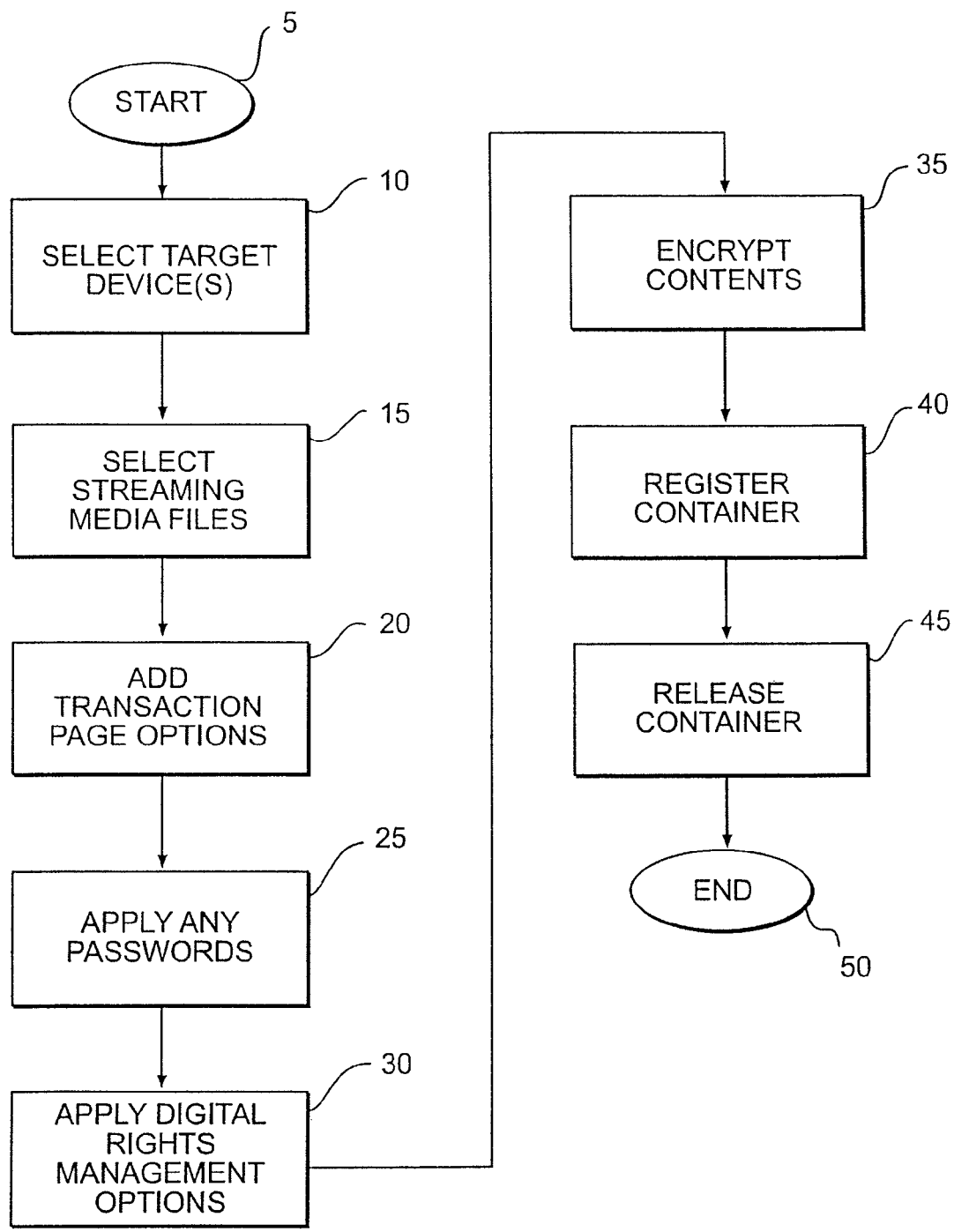
FIGS. 1A and 1B are flow diagrams of embodiments showing steps of creating a secure streaming container.

FIG. 1A is a flow diagram of an embodiment showing steps of creating a secure streaming container (SSC) beginning at step 5. At step 10, target devices are selected that may be receiving the SSC. These may include various devices including, for example, cell phones and computers and the like, as described further below. At step 15, streaming media files are selected to be included in the SSC. These may be, for example, video, audio, text, animation files, and the like. At step 20, transaction options are selected to establish the type of information or data that a user may be required to perform to access the SSC. This may include payments or submission of information such as, for example, personal data, or passwords. At step 25, any passwords to aid in protecting the SSC are applied to the SSC. At step 30, digital rights management (DRM) options are applied to the container to control access to the SSC. The DRM options are explained further below. At step 35, the media contents are encrypted using any known encryption technique. At step 40, the SSC is registered with a digital container server (or service) so that it is a known object and may be correlated to future activity. At step 45, the SSC may be released to carry streaming media content to target devices and users. The process ends at step 50.

Figure 1B:
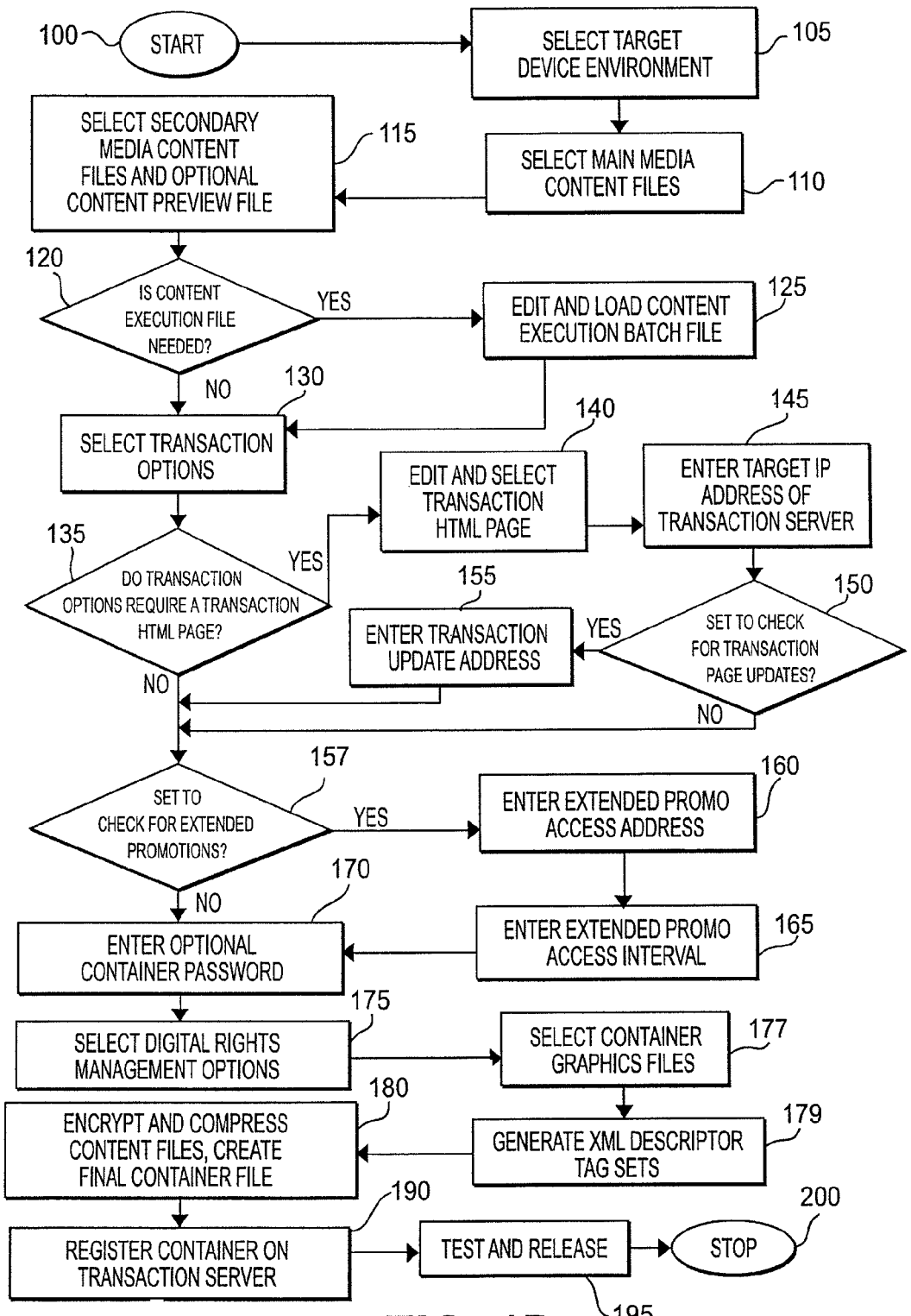

FIG. 1B is a flow diagram of an embodiment showing steps of creating a secure streaming container (SSC), beginning at step 100. FIGS. 2A-2K are embodiments of graphical user interfaces (GUI) to illustrate various exemplary user inputs, and are explained in conjunction with the steps of FIG. 1B. FIGS. 1A and 1B (and 8A and 8B) may equally represent a high-level block diagram of components of the invention implementing the steps thereof. The steps of FIGS. 1A and 1B (and 8A and 8B) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. Continuing with FIG. 1, at step 105, a set of target devices is selected which may include selecting a family of devices on which the secure streaming container is intended to operate. This may be useful in situations because the media file contents of the new container may only be intended for certain devices or because the storage capacity and processing power of certain devices may not support the operation of the container.

Figure 2A:
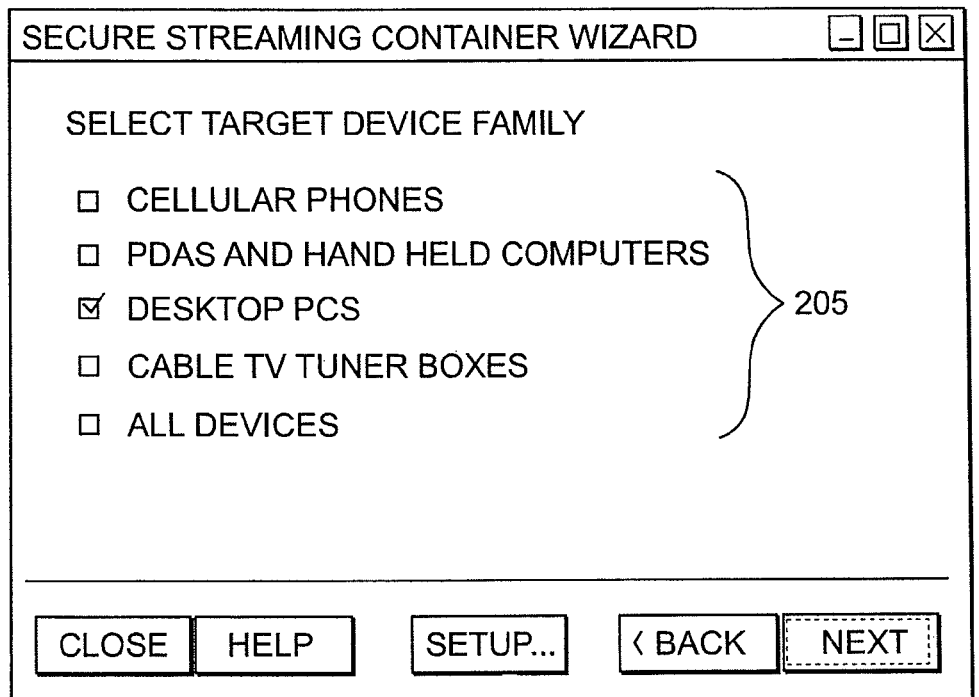

An example of this selection screen is shown in the graphical user interface (GUI), generally denoted by reference numeral 200, of FIG. 2A. The prompts of FIG. 2A permit selective inclusion of one or more target device families, generally denoted as reference numeral 205. An individual target device may be selected by the creator of the streaming container for inclusion by clicking on the device family. These devices may include, but are not limited to:

Cellular phones—These devices typically may have the smallest storage and processing capability. They also may have unique operating systems and visual displays that may require appropriate container code modules directed to support these displays and operating systems.

Handheld devices—These devices include music players, Personal Data Assistants (PDAs) and tablet computers that typically have mid-range storage and processing capability. These devices also may or may not have unique operating systems and visual displays that may require appropriately constructed container code modules.

Desktop computers—These devices typically have large storage capacity and functional capability and usually are capable of handling large media files. A wide variety of operating systems may be encountered on these devices.

Cable TV tuner boxes—These devices typically handle very large media files such as large format feature films and may have distinctive operating systems that may require container code modules constructed to interact appropriately with the tuner boxes' architectures.

Satellite receivers—these devices may handle various types of media files with varying operating systems.

As seen in FIG. 2A, the container creator may be able select the "All Devices" setting. This setting will direct the container creation application to include all the code modules needed for the container to operate on all target devices. While this may enable the container to operate on the largest number of target devices, this maximizes the container size. Conversely, selection of a subset of target families reduces the container size, which typically is more efficient to transmit and process.

At step 110, the main media files to be included in the streaming container may be selected. Prior to being selected and prior to being inserted into the container, the media files may be encoded into audio and video formats that may be properly decoded and played by commercially available players, for example, Microsoft Windows Media Player™ (trademark of Microsoft Corporation), Real Media Player™ (trademark of RealNetworks, Inc.) or other publicly distributed media players, as required. Alternatively, in embodiments, the media files may be encoded after selection. The container may also be configured to access an internal media player (typically non-commercially available, except as provided by the digital containers in the course of its streaming functions but may include uniquely tailored and modified commercially available players but are only available for use by a digital container). The container may be programmed to use only the internal media player or it may be set to use the internal player if no resident media player is detected on the user's machine that can play the enclosed file. The container may be configured to carry (i.e., transport and deliver) multiple media files, if desired.

Figure 2B:
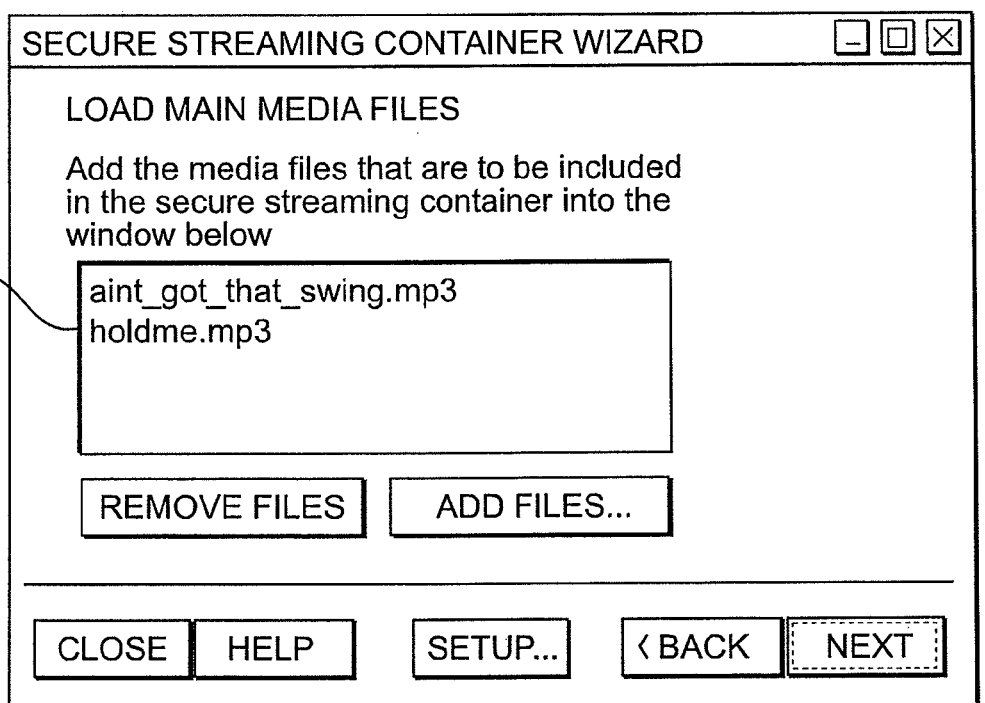

FIG. 2B shows an exemplary GUI for selecting and including one or more media files into the secure container, in accordance with step 110. The user may maintain a library of media files and search, add, or remove content media files that are to be included in the secure streaming container, as necessary. For example, FIG. 2B also shows a "Remove Files" button and an "Add files" button to facilitate the selection process. FIG. 2B shows two media file names in a load box 210 (e.g., "aint_got_that_swing.mp3" and "holdme.mp3") that may be selected, however, it should be understood that this is an example and that any number of media files may be viewed and selected, as necessary.

At step 115, secondary media files may be selected to be included in the streaming container of the invention. These secondary media files may include, for example, html text and images (or other supporting files typically associated with media files) that may be viewed in a browser while the media files are being played. These secondary files may also include a segment of the main media file that can be previewed by the user before executing a purchase transaction, as discussed below. In one embodiment of the invention, a portion of the main media file may be left unencrypted for previewing instead of adding a separate preview file.

Figure 2C:
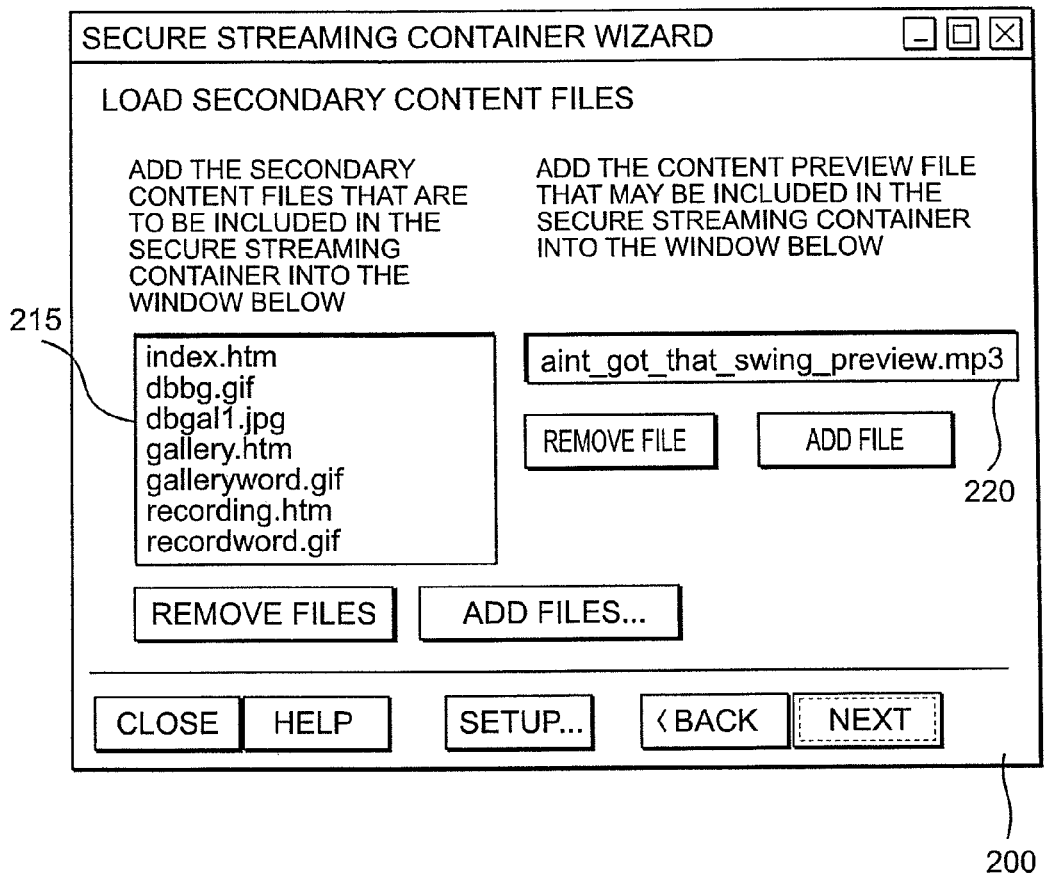

FIG. 2C shows a GUI for selecting one or more secondary files, generally denoted as reference numeral 215. Selection of these secondary files may be associated with a main media file 220, previously selected via load box 210 in FIG. 2B which is associated in the container and during playback. A user may select any number of secondary files to associate with a main file, and further, may navigate to other main files for associating secondary files to the other main files, as necessary. Once associations are established, these media files, and any respective associations between main and secondary files, are maintained when constructing and playing the streaming container.

Figure 2D:
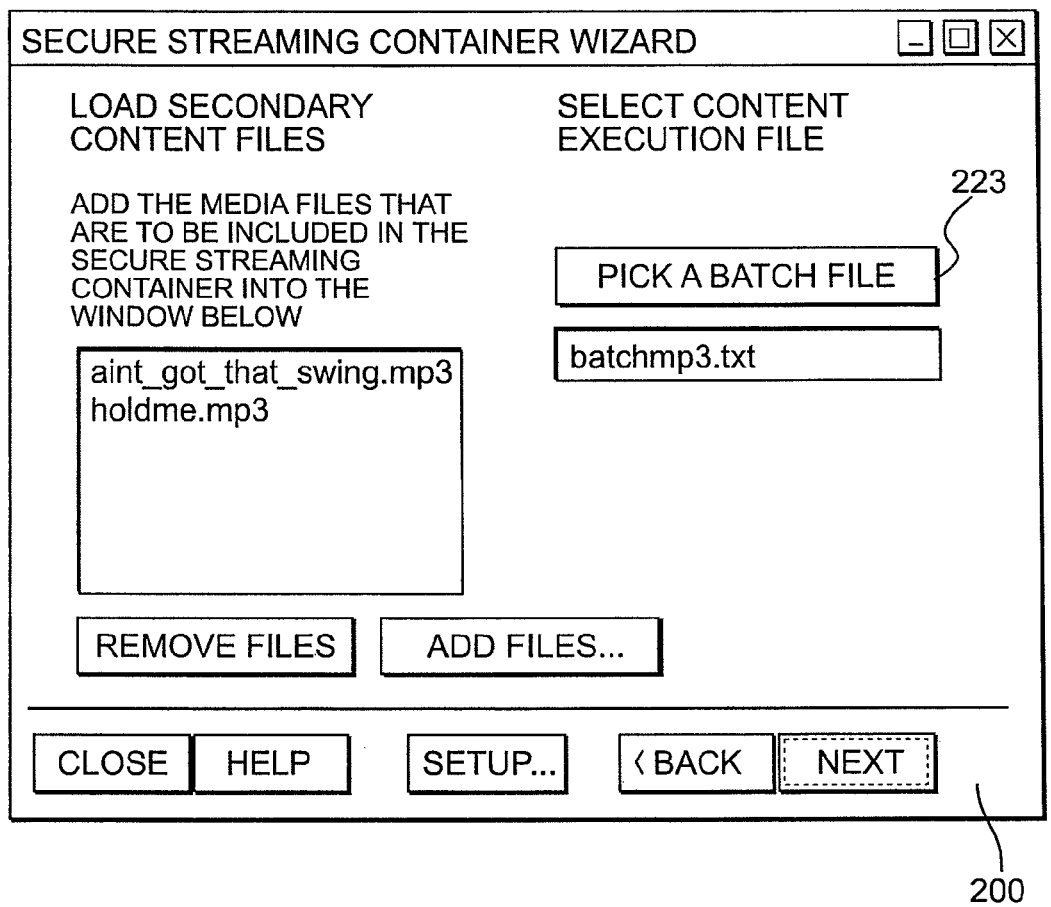

At step 120, a check is made whether a content execution file is needed. FIG. 2D shows an exemplary GUI for selecting a content execution file. If a content execution file is deemed necessary, then at step 125 content file execution options are selected. This may involve editing and adding an optional execution batch file 223 (FIG. 2D) that provides the container with content file order (i.e., sequencing and preset sequencing at various time intervals or preset relative timing between media files during playback) and timing instructions. For example, the container may be set to play an introductory content file when it first opens and then wait for a certain time interval before playing a second content media file.

Figure 2E:
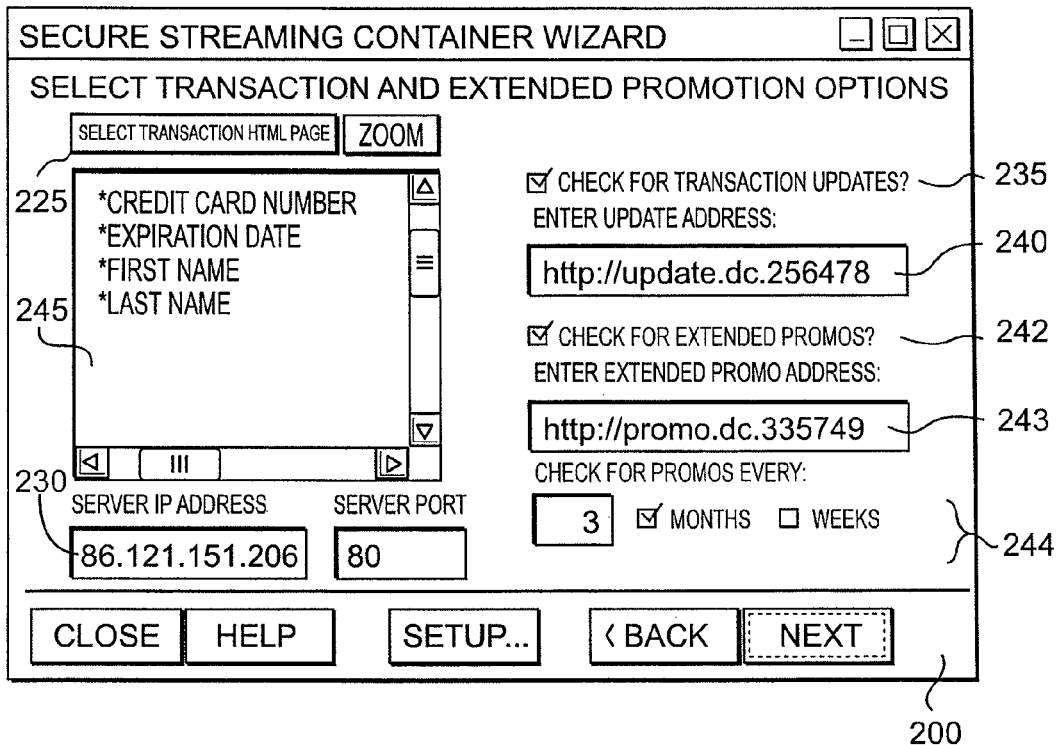

At step 130, streaming container access transaction options may be selected. Step 130 may involve determining the type of transaction(s) that must be successfully executed in order to authorize the recipient user to open the container. FIG. 2E is an exemplary GUI showing options for selecting transaction options. The options include, as discussed further below, selecting a transaction page 225, selecting a server IP address for eventual contact, an option to select transaction updates 235, credit card information 245, an update address 240, an option for extended promos (i.e., promotions), an address for extended promos, and an option to select checking for promos interval 244. FIG. 2E further shows an IP server box 230, as well as interfaces for extended promotions 240 and accompanying IP address box 243. A time period may also be specified.

At step 135, a check is made whether a transaction page is required, and if so, at step 140, a transaction html screen (or similar screen) may be selected (e.g., 225) to be included in the container. This html screen, when presented to a recipient user, informs the recipient user as to what type of information to input in order to process the transaction. When the recipient user attempts to open the container the first time, this transaction html page is displayed in a browser. In embodiments, this html page may be displayed in an internal browser carried within the streaming container. In other embodiments, this html page may be displayed in the user's resident browser.

At step 145, a target IP address 230 of a container verification database server, that is accessible in order to process the transaction, may also be entered or in other setup screens provided by the container creation application. The html page may also provide a user access to various transaction screens such as, for example, the screens illustratively shown in conjunction with FIGS. 2F and 2G, as discussed below.

FIG. 2F is an illustrative embodiment of a credit card transaction screen (i.e., GUI), generally denoted by reference numeral 202, and selectable via the selection option 225 of FIG. 2E and is equivalent to the credit card option 245. This GUI may be included in a streaming container and used to receive user credit card information, denoted by reference numeral 250, to validate access to streaming container contents. The credit card information may include, for example, name, address, credit card number and expiration dates, email address, or the like.

Figure 2G:
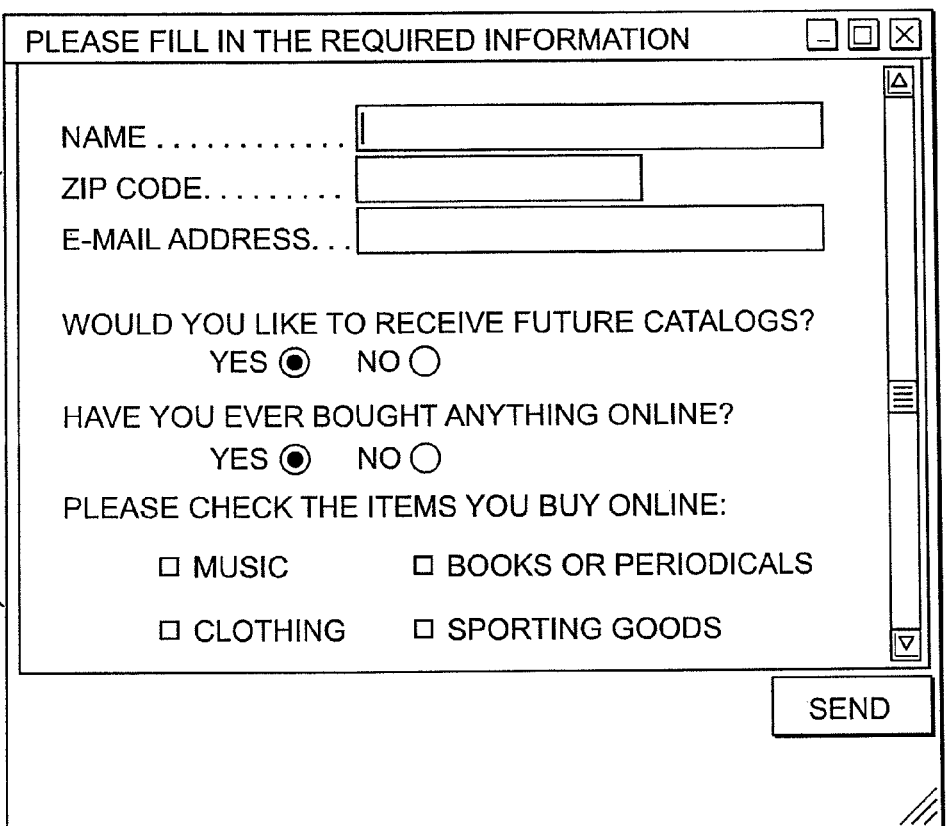
Figure 21:

FIG. 2G is an illustrative embodiment of demographics information transaction screen (i.e., GUI), generally denoted by reference numeral 203, and may be included in a container via select transaction page 225. This GUI may include prompts for acquiring different aspects of the user's interests and desires, denoted by reference numeral 255, and may include other inquiries, as appropriate. The exemplary embodiments of FIGS. 2F and 2G may be included in the streaming container for presentation to a recipient user when accessing the streaming container, or may be selected for inclusion in the streaming container as transaction options (e.g., as selectable options as part of the GUI 200 of FIG. 2E). In aspects, access to the digital contents of the streaming container may be restricted (e.g., partially or wholly) until the information (e.g., 250 and 255) has been provided by the recipient user.

At step 150, and still referring to FIG. 2E, a check is made for transaction page updates 235. The ability to dynamically access transaction updates provides for substitutions of content at any time, thereby, replacing, modifying, or adding to the content of the transaction page originally placed in the container. In other words, the streaming container when constructed may be primed to seek current promotional or substituted presentations (i.e., content) at later dates when a recipient user eventually accesses the streaming container. The substituted content may also be constructed to seek add-in content, even from other IP addresses, as necessary. In this manner, one or more add-in promotional contents may be linked into the streaming container long after the streaming container has been initially launched and already arrived on a recipient user's computer. Access to these new promotional container contents may be sold to other media creators and promoters, especially when demographic data initially gathered from the recipient user provides indication of likely candidates for the add-in content.

A variety of transaction types may be used to gain permission to open the container. These may include financial transactions such as credit or debit card transactions, or similar payment plans. These may also include the gathering of a password(s), the gathering of previously established personal or device identification information, or the gathering of generalized demographic information.

An example of the gathering of personal identification information may be any type of user or company ID numbers as well as input data from biometric measuring devices such as voice, fingerprint, physical attribute data, or retina/iris scanners. An example of the gathering of device identification information is input from secure hardware plugged into the user's device or secure removable storage inserted into the user device's CD or floppy drives. This type of data must be established as acceptable access information and entered into the container verification database prior to the release of the container.

This information can be required in various combinations. For example, a user could be required to input a user ID number and input from a fingerprint scanner to gain access to the container. When more than one type of input is required, the container is said to be in a multi-factor authentication mode.

FIG. 2H is an illustrative embodiment of a subscription option GUI, generally denoted by reference numeral 206, and included in the streaming container when selected as a transaction option setting (e.g., settable as an option as part of the GUI 200 of FIG. 2E). For example, the user may be prompted to purchase multiple containers at a reduced price per container. The user may also be prompted to purchase similar containers for a certain price that is related to a certain time period, for example, time periods 260. If multiple containers are purchased in one subscription transaction, the containers included in the subscription program that are subsequently delivered to the user may be opened on the user's device without requiring an additional financial transaction. A credit card transaction screen 265 (or other financial transaction input screen) may be also included in the subscription option GUI.

At step 150, the digital container may be configured to check to see if any transaction updates are available. For example, the content originator may decide to offer a sale on the contents associated with a streaming container. Instead of generating a new container, an updated transaction html page (or similar language) that displays the new offer and price information may be made available at a certain IP address. When the container is configured to check for transaction updates, then at step 155, a transaction update address may be entered so that any new html page may be automatically downloaded from an IP address, when the transaction browser opens at a recipient location.

If no at step 150 or 135, at step 157, a decision may be made to configure a check for extended promotions. Dynamic access to extended promotional offers provides for maintaining an advertising or promotional program through dormant containers as they reside on users' devices. So, the streaming container, when constructed, may be primed to seek extended promotional or marketing presentations at timed intervals that are established when the container is created. This is accomplished by a control module, inserted into the digital container when extended promos are selected (e.g., 242, of FIG. 2E). No recipient user action is necessary for this function to occur. Thus, the digital container may be programmed to automatically seek (once opened at the recipient users location) these extended promotions or marketing presentations when selection 242 (FIG. 2E) is selected. If yes at step 157, at step 160, an extended promotion address 243 may be entered which is an address from which the digital container uses to seek the extended promotions and/or marketing presentations at time intervals 244 (as selected during container construction).

At step 165, extended promo access intervals 244 may be selected. Once the container is opened, at selected time intervals the container contacts the IP address as set in the extended promotion address 243. If appropriate extended promotional content is available, this content is automatically downloaded and displayed in a browser window, for example, as illustrated in FIG. 2I, and generally denoted by reference numeral 207. The extended promotional content obtained from the address 243 may also be constructed to seek add-in content, even from other IP addresses, as necessary. In this manner, one or more add-in contents may be linked into the streaming container long after the streaming container has been initially launched and already arrived on a recipient user's device. Access to these promotional container contents may be sold to other media creators and promoters, especially when demographic data initially gathered from the recipient user provides indication of likely candidates for the add-in content. In embodiments, this feature may be disabled.

At step 170, the container may also be configured to use a password as a secondary security option. In this mode, the user may enter the proper password each time the user wishes to open a streaming container even after gaining one or more accesses to the container through a successful access transaction. This provides an added level of security to prevent unauthorized access to the streaming container, which typically may occur at the user's computer.

At step 175, digital rights management options may be selected. These options include setting access rights to the container and digital content that the recipient user may have after access to the streaming container is successfully obtained. For example, the user may be granted unlimited access to the content file after the container is purchased or the access may be limited to a certain number of instances, a certain period of time, or a combination. Rights to other processes such as transferring the content file to another device or copying the file to a secondary storage medium may also be configured.

Figure 2J:
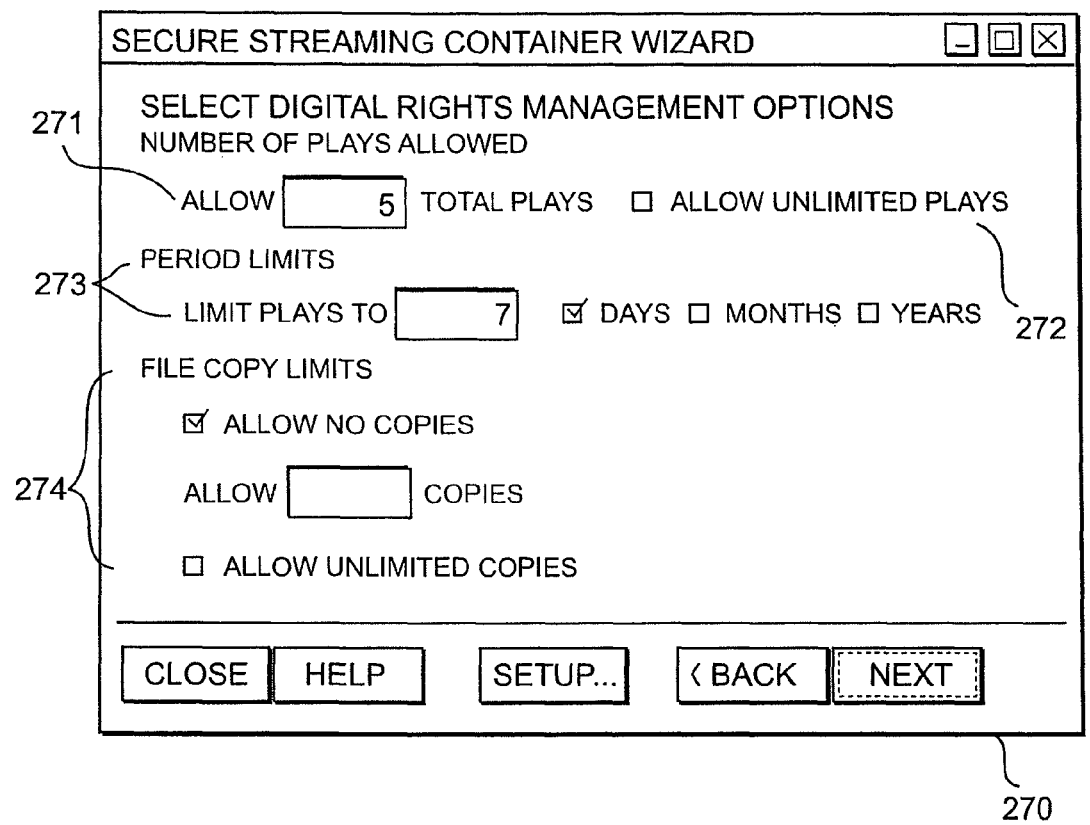

FIG. 2J is an illustrative embodiment of a digital rights management selection screen, generally denoted by reference numeral 270. As shown in FIG. 2J, options may be selected for setting how many plays are permitted 271 or unlimited number of plays 272. Also, selections may be made to limit the time period 273 (e.g., by number of days, months, and years) that plays may be made. Additionally, options to control file copying 274 may be selected and include "Allow No Copies", "Allow Unlimited Copies" or "Allow N Copies". For example, a user may be restricted to copying a content file twice.

Figure 2K:
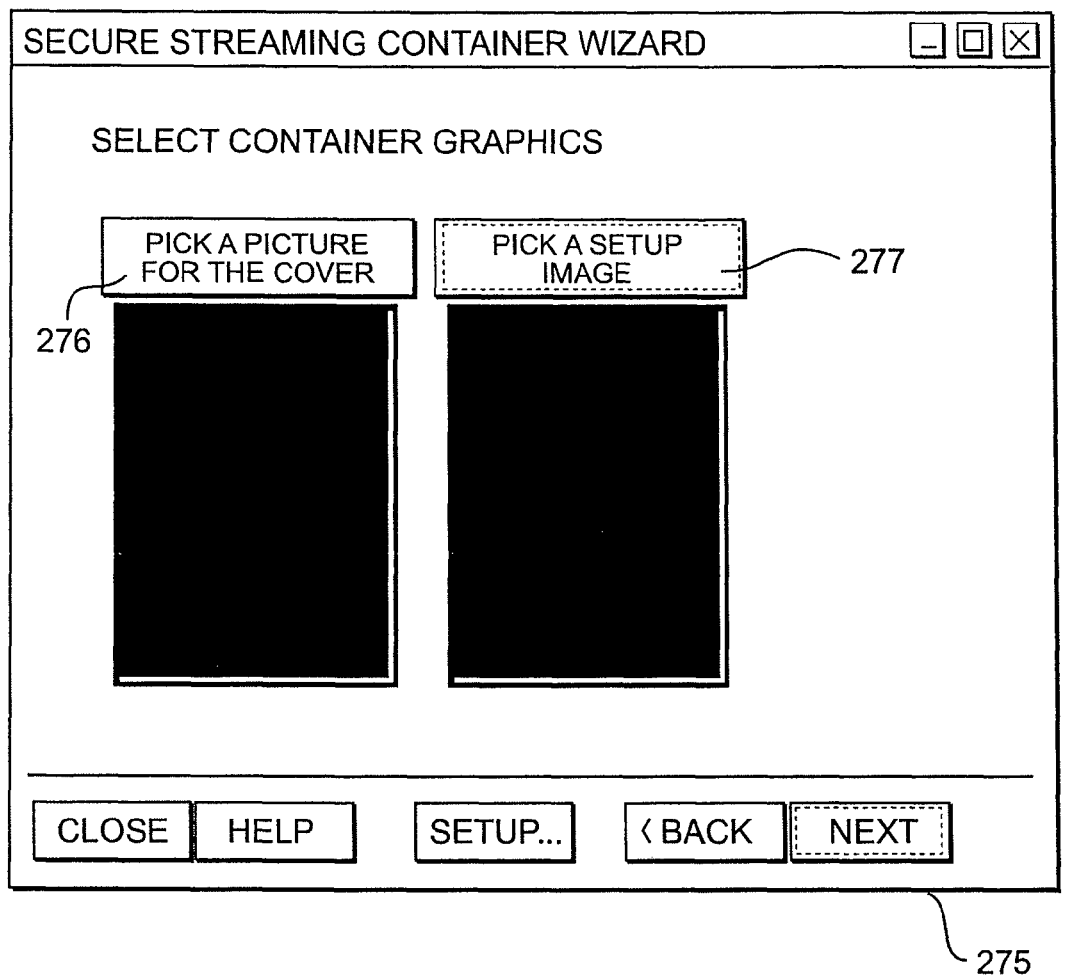

At step 177, graphic files for the container may be selected. These may be informational and promotional graphics that appear on the cover and inside the container after it is opened. These graphic files may be static images as well as animated images such as animated gif files or Flash™ files. FIG. 2K is an embodiment of a GUI showing options for selecting container graphics, denoted generally by reference numeral 275. Options may include selecting a cover picture 276 and selecting a setup image 277.

At step 179, container creation application may automatically create, for inclusion within the finished container, informational and search metadata tags. These may be unencrypted XML tags that various devices (e.g., tags conforming to OMA wireless download specifications, or other device guidelines) and search engines use during the discovery, download and installation processes involving the container. These tags may be created by an XML code engine that is typically resident in the container creation application.

When created, the XML tags may be organized into at least two distinct tag sets. These are called the download descriptor and the digital rights management (DRM) descriptor. Another tag set, called the search and information descriptor, may also be included in the container. The XML engine automatically reads the data for some of the tags from the container creation parameters, while the data for other tags may optionally be manually inserted by the container creator.

The download descriptor provides data such as file size and file type to target devices so that the potential streaming container download may be evaluated. For example, the device may read the file size tag and determine that the file size is too large for the resident storage and abort the download. An example of a download descriptor tag segment may include:

```
<name>digitalcontainer100</name>
<objectURI>http://www.wireless.com/s?id-100
    </objectURI>
<size>247880</size>
<type>audio/mp3</type>
<type>text/html</type>
<title>It Don't Mean a Thing </title>
```

It should be apparent that this exemplary download segment may express many other types of descriptions, as necessary, for example, other file types, sizes and titles, etc. This example provides a container name (e.g., "digitalcontainer100"), an object URI address (e.g., "http://www.wireless.comPid-100"), size of the file (e.g., "247880"), audio type (e.g., "MP3"), text type (e.g., "html"), and a title of the content (e.g., "It Don't Mean a Thing").

The digital rights management descriptor may provide access rights data to certain devices for evaluative and operational purposes. The XML engine in the container creation application may read the input of the digital rights management selection screen and automatically create the DRM descriptor tag set. An example of a DRM tag segment may include:

```
<play>
    <constraint>
        <interval>P7D</interval>
        <constraint>
            <count>5</count>
        </constraint>
    </constraint>
</play>
```

In this example, the XML engine has read the input from the digital rights management selection screen, shown in the example of FIG. 2D, and created properly formatted XML tag code. This tag set conveys to the target device that the content file may be played five times (e.g., "<count>5</count>") in a seven day period (e.g., "<interval>P7D</interval>") beginning with the first instance of the playing of the content file, or alternately, from the date of reception. It should be apparent that other parameters may be created, as necessary, potentially complex.

Figure 3:
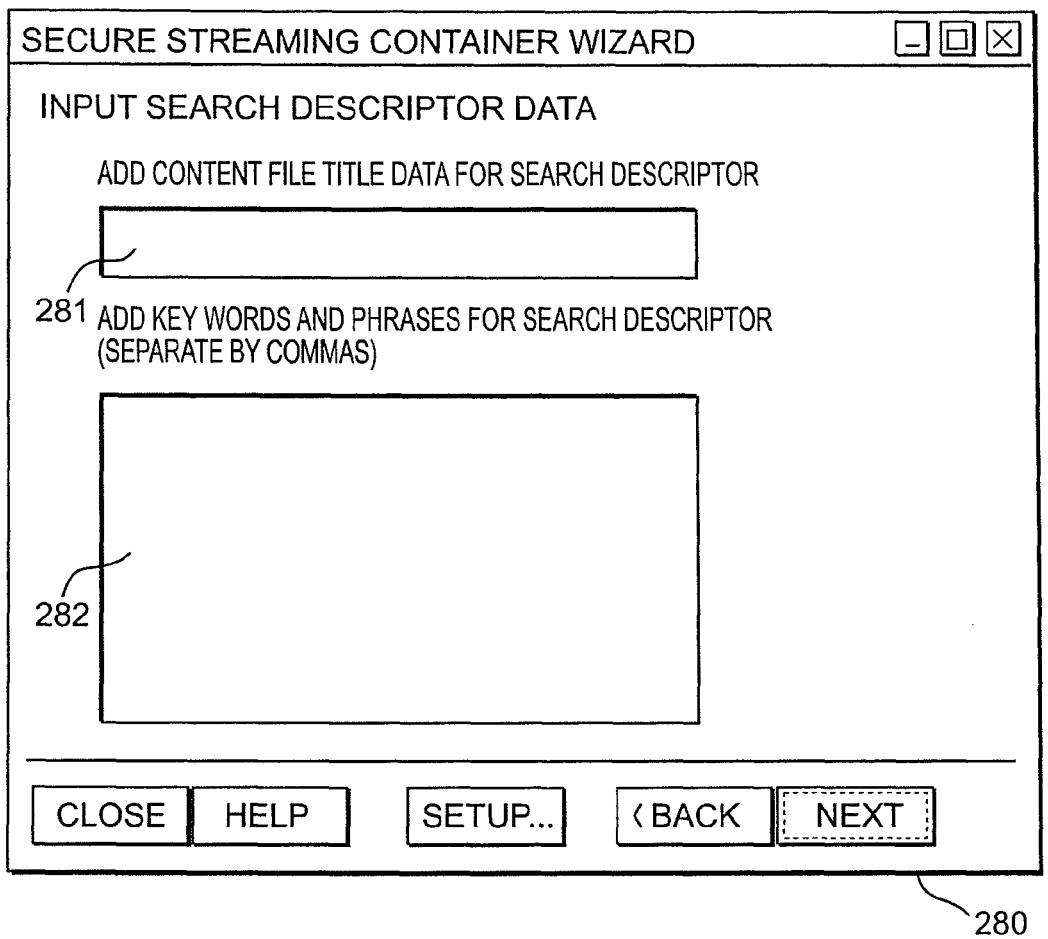
FIG. 3 is an embodiment of a GUI for input of search descriptor data, according to the invention.

The search descriptor tag set provides content file title, key word and key phrase data to web and peer-to peer search engines. FIG. 3 is an embodiment of a GUI for input of search descriptor data, denoted generally by reference numeral 280. The search descriptor data may be manually input by the container creator by using the exemplary GUI 280. This includes a field for entering a file title data 281 and a field to enter key words and phrases for search descriptors 282.

The presence of the download and digital rights management XML descriptors provides that the secure streaming container, in embodiments, may be compliant with the Open Mobile Alliance (OMA) Wireless Download and DRM Specifications. The descriptors also comply with the standards and conventions of the Open Data Rights Language (ODRL).

At step 180, the final streaming container may be encrypted and compressed, i.e., once all appropriate files and parameters are selected using the container creator application, using encryption/decryption and compression/decompression algorithms. The modular design of the container allows for continuous upgrading of the encryption and compression algorithms as these technologies progress.

The encryption/decryption process (as performed during streaming container creation and subsequently upon decryption of the SSC when a recipient user accesses a SSC) involves a decryption key handling scheme that employs a single key/hidden key authorization system. In this technique, the encryption algorithm used to encrypt the container produces one or more decryption keys. At least one decryption key travels with the container as a "hidden" single key. Known encryption engines may be used with the invention.

At step 190, the streaming container is registered with a transaction server by sending container identification information to a centralized container server (e.g., 352 of FIG. 7) typically, via network communications, or the like. At step 195, the secure container may be tested to assure proper operation as intended and then release for general propagation according to, for example, a marketing or publicity campaign. The test may involve sending a test SSC with test streaming media to a test recipient to verify all SSC components work as expected. The secure container creation process completes at step 200.

Figure 4:
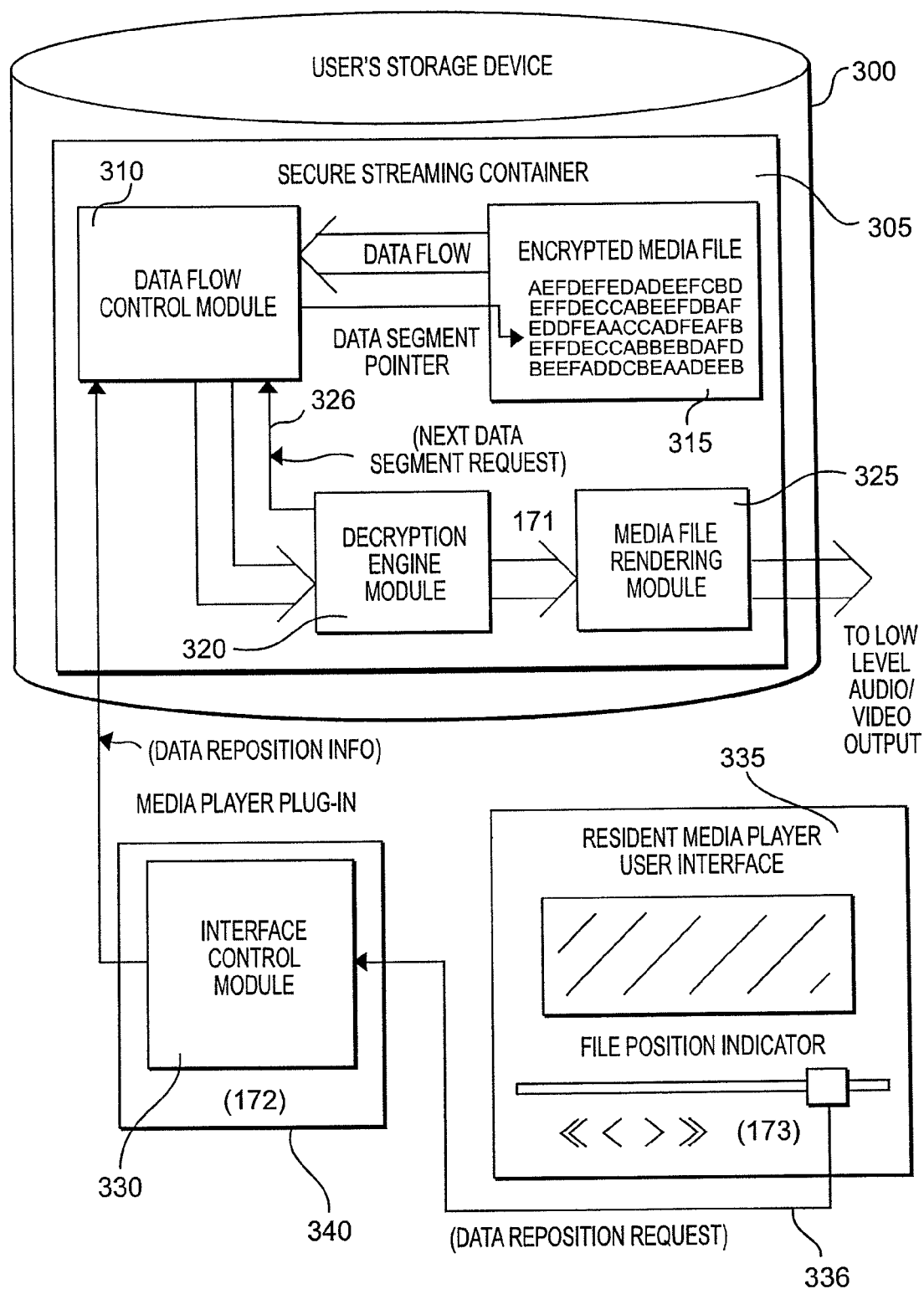
FIGS. 4-6 are functional block diagrams of embodiments of secure container operations, according to the invention.
Figure 5:
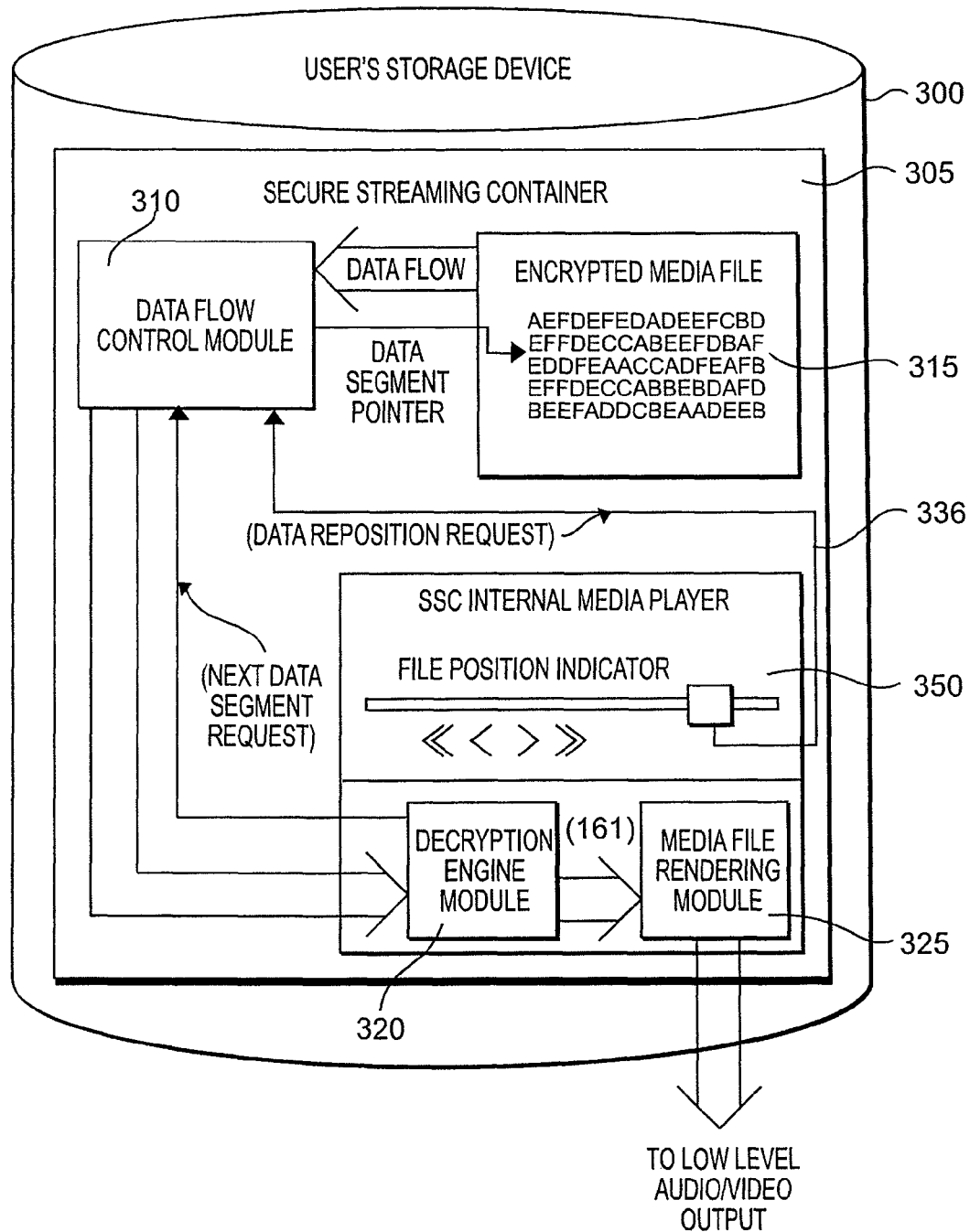
Figure 6:
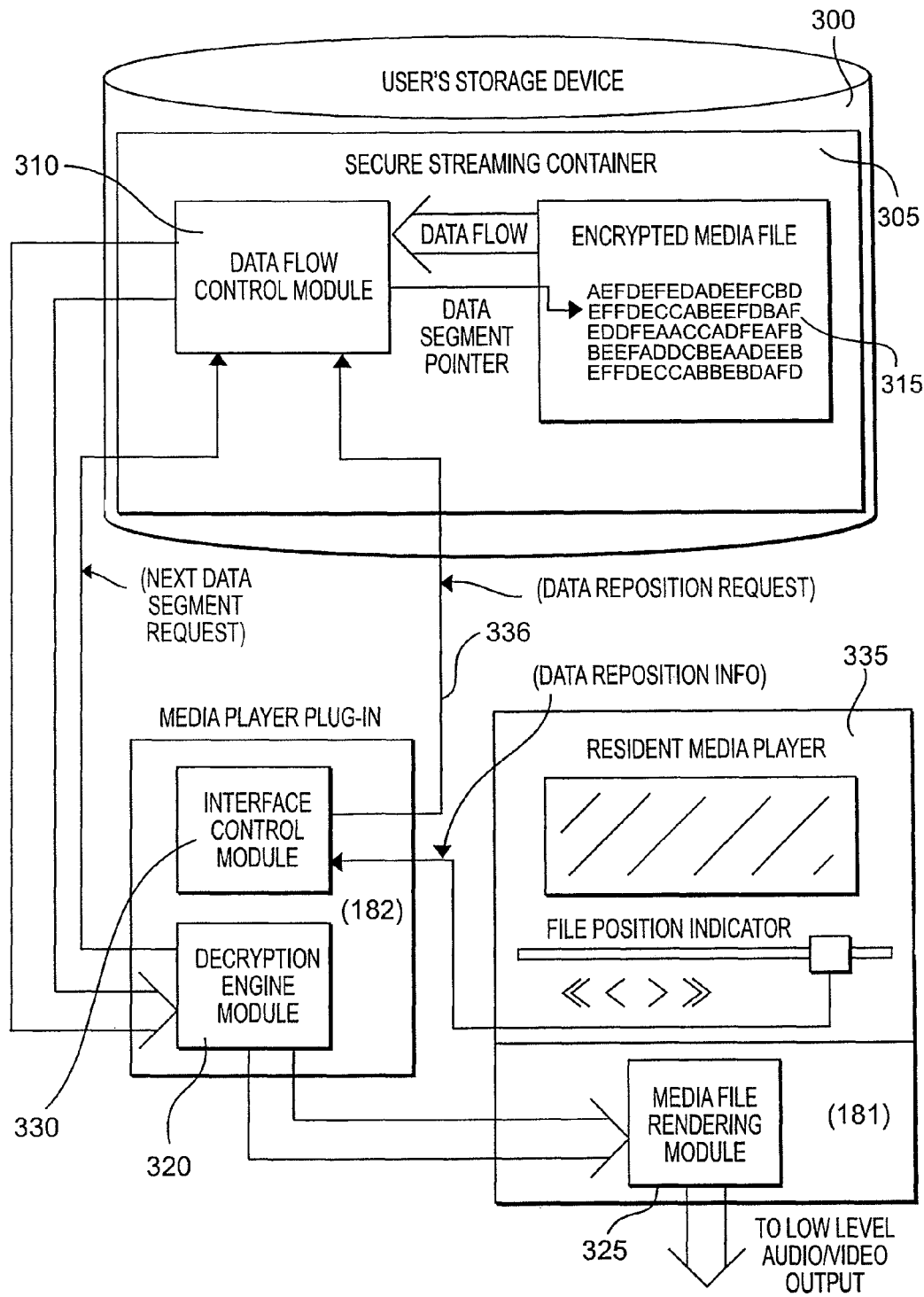

FIGS. 4-6 are functional block diagrams of embodiments of secure container operations. FIGS. 4-6 may equally represent steps of implementing the invention. One or more components of the embodiments of FIGS. 4-6 may be included in secure streaming containers, when created, to enable the secure streaming control function when the content of the streaming container is subsequently sent to and accessed by a recipient user. The secure streaming control function controls streaming of the content media file to the user's device, depending on configurations. The one or more components include software code modules that control the data flow, content file decryption and media player functions that are mutually executed by the secure streaming container and the user's device.

Referring to FIG. 4, the embodiment includes a user's storage device 300, which may be a disk, memory (e.g., flash, non-volatile memory, protected RAM, or the like), CD-ROM, DVD, and similar devices. A secure streaming container 305, maintained within the storage device 300, contains electronic content (e.g., streaming media content). The embodiment includes a data flow control module (DFCM) 310 which typically directs the operations of all modules related to the playing of any media files (encrypted and unencrypted) and controls the data flow from the encrypted media file 315 (i.e., encrypted streaming media such as, for example, animation, video, audio or the like) in the secure streaming container 305 to the resident media player 335. A resident media player is a player to play the media (e.g., video, audio, animation) available on the device and is typically not provided by the digital container, for example, Windows Media Player™ or Real Media Player™.

A decryption engine module (DEM) 320 provides the decryption function for decrypting any encrypted files (e.g. 315). This engine may use any known encryption/decryption scheme. The DEM 320 receives encrypted media file segments from the DFCM 310 and sends decrypted file segments to the audio/video file rendering module (RM) 325. The RM 325 typically contains the appropriate codec(s) (coder/decoder) for any media to be played and turns a media bit stream into output that can be understood by appropriate operating system audio and video drivers. A media player plug-in 340 allows the secure streaming container to communicate with the resident media player and may include an interface controller module (ICM) 330 that may be called when the container uses the resident media player user interface 335. The plug-in 340 may be supplied by the SSC, selected and initialized by the DFCM 310 for any appropriate media player being used.

The ICM 330 processes input signals from the resident media player 335 and controls and translates them into commands that can be understood by the DFCM 310. If a user repositions a position of the streaming data (e.g., back-up or forwards within a file), this may be accommodated also via the data reposition request 336. A next data segment request 326 is used to signal when a next segment is required for processing; this regulates the sequential flow of media segments from the encrypted media file 315 under control of the DFCM 310 and DEM 320.

The operation of the SSC 305 provides flexibility in delivery streaming media while protecting the contents of the SSC. In this operation, streaming of the media by-passes non-volatile memory or persistent memory during the streaming process. The SSC provides continuous data to the internal media player (e.g., 335) without disruptions (unlike streaming across networks where disruptions are common). Additionally, only segments of the encrypted media are ever in transit as decrypted data while protection of the encrypted media files 315 is maintained in the container. This makes for unauthorized access essentially impossible.

FIG. 5 is a functional block diagram of an embodiment of a secure container operation. The embodiment includes a secure streaming container internal media player (SSCMP) 350. The SSCMP 350 may be included in secure streaming containers and may be used when the SSC carries non-proprietary media file types. These may be any type of media player as selected when the digital container is constructed. This differs from proprietary media players since proprietary players are those commercial media players such as, for example, Windows Media Player™ and Real Media Player™. The operation of the embodiment of FIG. 5 is similar to the embodiment of FIG. 4. The internal media player 325, supplied by the SSC is used and initialized. Since this is provided by and controlled wholly within the SSC, the security of this configuration may be even higher.

FIG. 6 is a functional block diagram of an embodiment of a secure container operation. In this embodiment, the DEM 320 and interface control module 330 are associated with the media player plug-in 320 in the target device memory and may be controlled directly by, or included within, the media player plug-in 320. The media file rendering module 325 may be within the resident media player 335.

Figure 7:
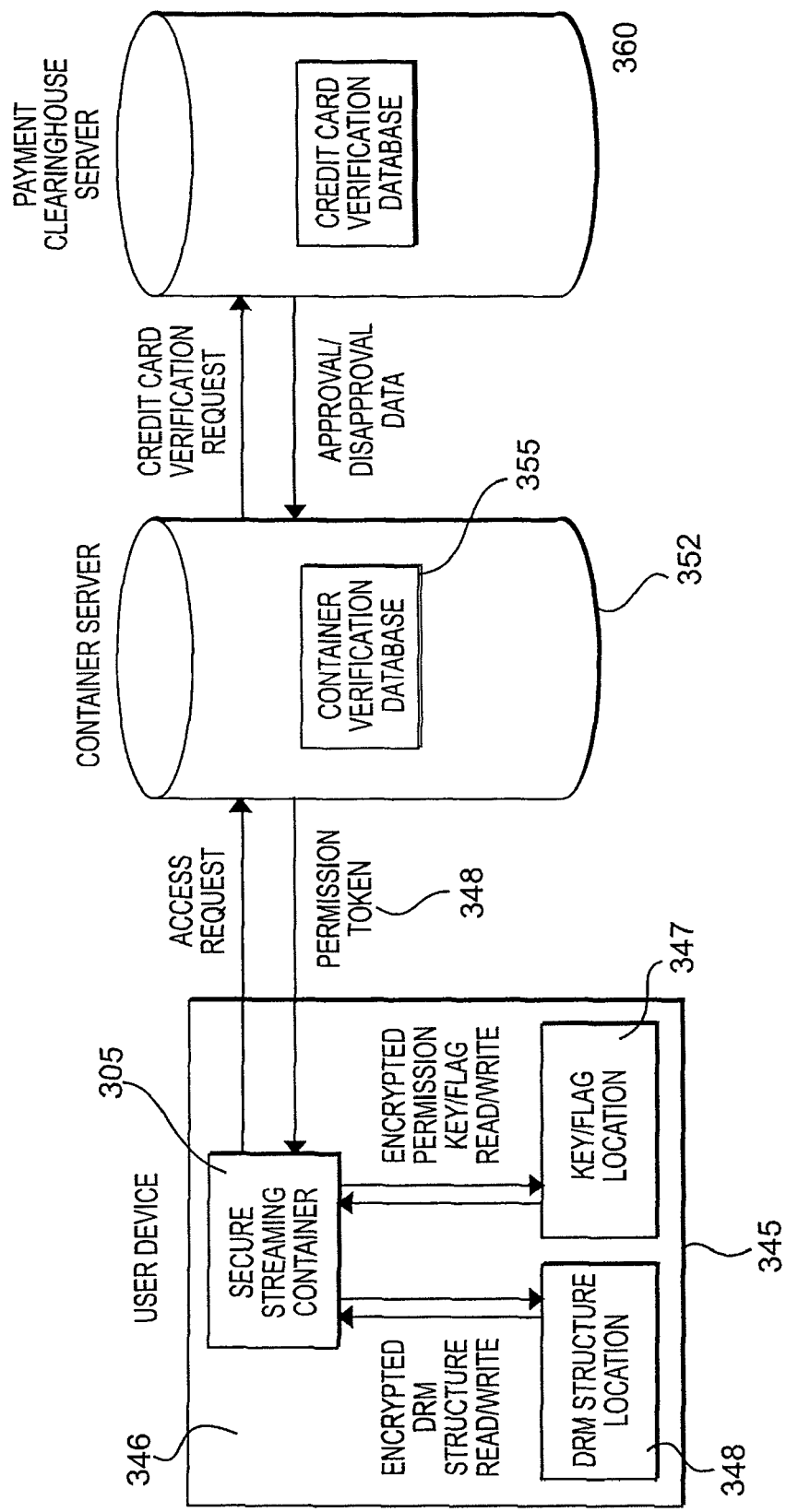
FIG. 7 is an embodiment of a GUI showing options for selecting container graphics, according to the invention.

FIG. 7 is a functional block diagram of an embodiment showing a streaming container authorization process. This embodiment includes a user device (e.g., personal computer, PDA, cell phone, or the like) with a streaming container 305 in the device's storage area 346 (e.g., memory, disk, DVD, CD, or the like.) A payment clearinghouse server 360 (alternatively, for example, a financial institution server, a governmental server, an educational server, or a commercial product provider server, or the like) may be accessed to authenticate a transaction.

When the user attempts to access contents of the secure streaming container 305, an authorization process may be initiated that is described in detail by "Regulating Access to Digital Content," U.S. Pat. No. 6,389,541; and "Tracking Electronic Content," U.S. patent Ser. No. 09/199,150, now allowed and issued as U.S. Pat. No. 6,751,670, each of which is incorporated by reference herein, in there their entirety.

When a recipient user successfully executes the container permission transaction (i.e., gains access to the contents of the container, for example, by supplying requite passwords, identification or financial credentials), a small bit of data unique to the user's device may be passed back to a container verification server 352, shown as an "access request." This may be accomplished by a recipient user accessing an on-line communication path to gain authorization with a container verification server 352. This small bit of data may be combined with the unique container identification data stored in the container verification database 355 to produce a packet of decryption data that becomes part of the permission token (shown as "permission token 348") that is passed back to the streaming container 305 on the user's device 345. An encryption algorithm uses this data to re-key the original key sent with the encrypted content data in the container. In this manner, the content is securely re-keyed in an insecure environment (such as a recipient user device) and the decryption of the content data is "locked" to that device. Transporting the streaming container, at this point, to another device, renders the streaming operation inoperative. With this process, there is no need to participate in the complex and expensive and commonly deployed Public Key Infrastructure system. The authorization process normally takes only a few seconds to complete.

Still referring to FIG. 7, in an embodiment of the invention, the streaming container 305 may be encoded as an executable file (.exe extension) to be used by a Windows operating system. In another version of the invention, the container may be encoded for delivery as encrypted text contained within an html file (.html or .htm extension) that may be accessed by a variety of operating systems including MS Windows®. In this embodiment, a java applet, for example, may be present on the user's device in order to interpret the instructions and encrypted content carried within the container. This java applet may be automatically downloaded from a web server the first time a user attempts to access the container. The java applet typically is downloaded once, unless the streaming container requires a later version than is present on the user's device. Other file types may be utilized may be utilized as appropriate.

When the streaming container 305 is initially created, it is registered within the container verification database 350. The registration comprises entering various identification, date and e-commerce data fields in the database. This data may be entered manually or it may be entered automatically through an ODBC connection between the database and an envelope creation application when using the streaming container creation application.

The streaming container is typically delivered to the user by email or other Internet delivery method, such as FTP download, website download, peer-to-peer file sharing service or instant messaging file transfer. The streaming container may also be delivered by wireless connectivity (e.g., cell phone or Bluetooth, or the like). The container may also be delivered by physical transport, such as floppy disc, CD-ROM or memory device.

In this process, an attempt by the user to open the secured streaming container prompts the container to look for an encrypted key or permission flag 347 that signifies that the container has been authorized to open on that particular device (e.g., 345). If the encrypted key or permission flag 347 is not found, the user is asked to enter transaction information (e.g., as illustrated in FIGS. 2F-2H) that may be passed to the container verification server in a unique and encrypted communication session (e.g., "access request" of FIG. 7). If required, the container verification server 350 consults the appropriate credit card verification server (or equivalent server as appropriate) for approval status.

When the approval status is received, the container verification server sends a permission token (e.g., "permission token") to the secure streaming container 305. The streaming container 305 then reads the permission token and writes an encrypted key or permission flag in the appropriate location (e.g., 347), depending on the operating system. The streaming container 305 also writes an encrypted digital rights management data structure to a secured location 348.

When the user attempts to reopen the container in a later session, the encrypted key or permission flag (e.g., 347) is found and the streaming container 305 opens without prompting the user again for transaction information. The container then reads and decrypts the digital rights management (DRM) data structure and the user is allowed access to the contents as allowed by the access rights provided by the DRM data. Once access to the content is authorized, the secure streaming container begins a process that streams the media file data to the user's device (e.g., display, audio output, or the like).

Figure 8A:
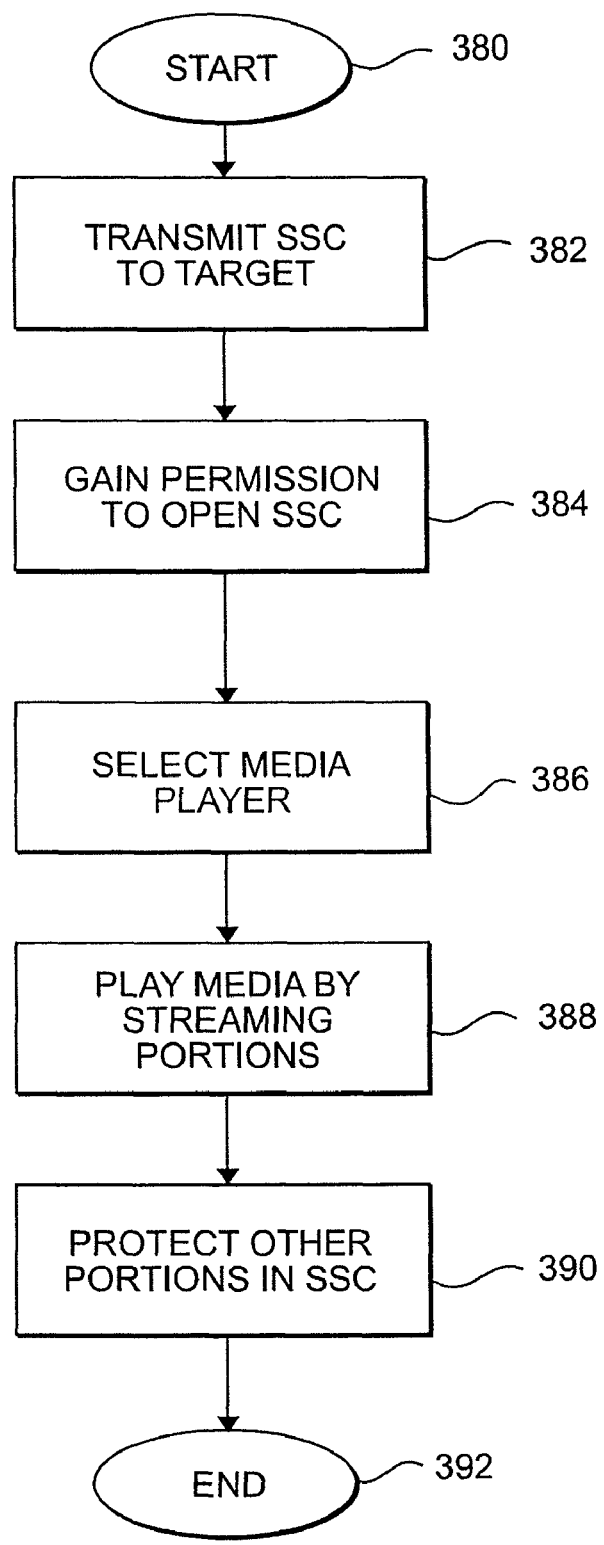
FIGS. 8A and 8B are flow diagrams of embodiments showing steps of using the invention.

FIG. 8A is a flow chart of an embodiment showing steps of using the invention, beginning at step 380. At step 382, a SSC having streaming media content is transmitted to a target device. At step 384, a user gains access to the SSC by providing transactional data such as, for example, credit card information, passwords, demographic data, personal data, or the like. At step 386, based on the type of media files in the SSC an appropriate media player is selected for playback of the streaming media. This may be a player resident on the target device or a player supplied by the SSC. At step 388, the streaming media is played by providing segments of the streaming media to the player. At step 390, other portions of the media remain in the SSC, securely protected from copying or unauthorized use. This technique provides high quality playback without interruptions or delays typically associated with streaming content over networks (e.g., the Internet). At step 392, the process ends.

Figure 8B:
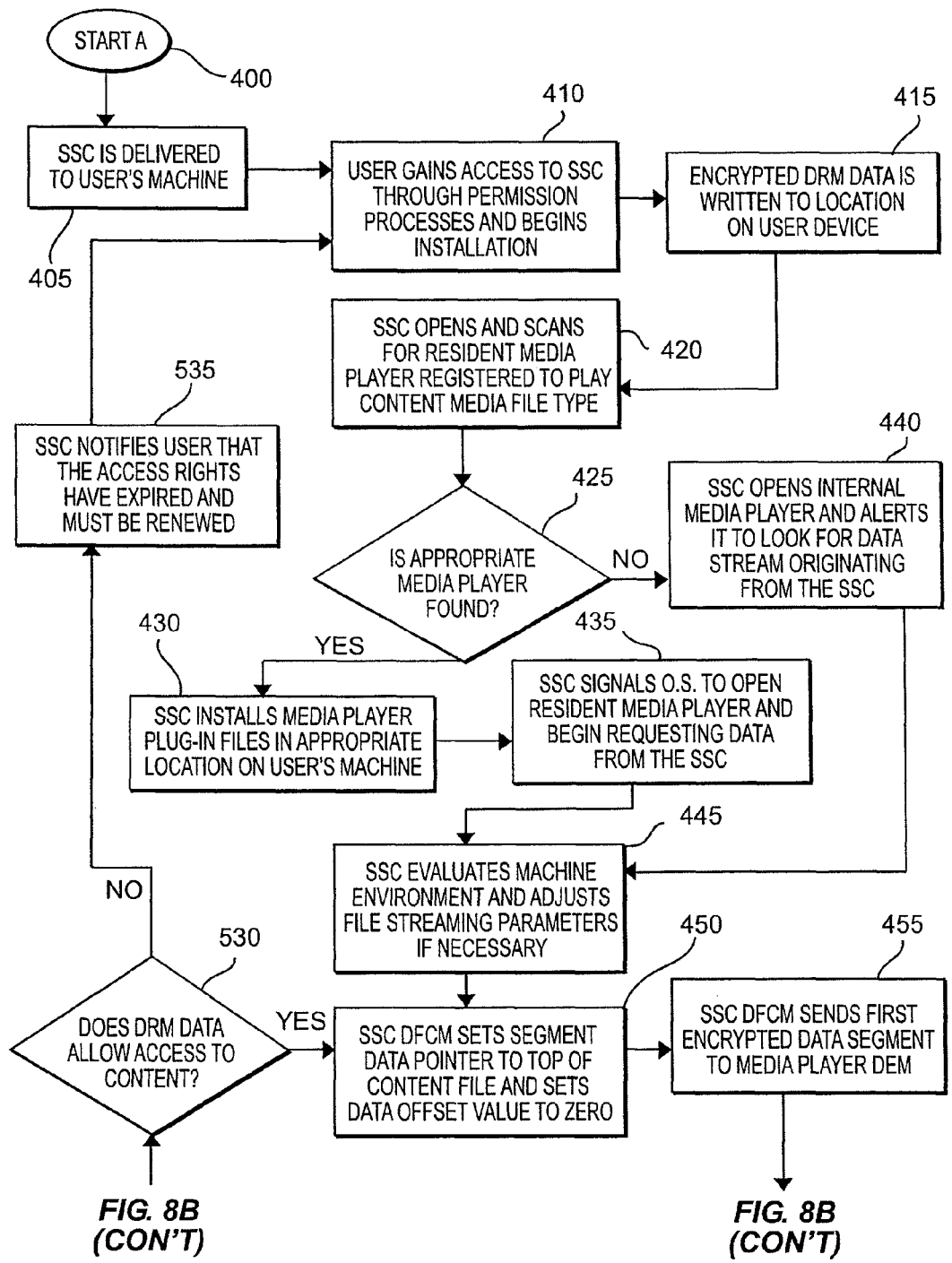
Figure 8B:
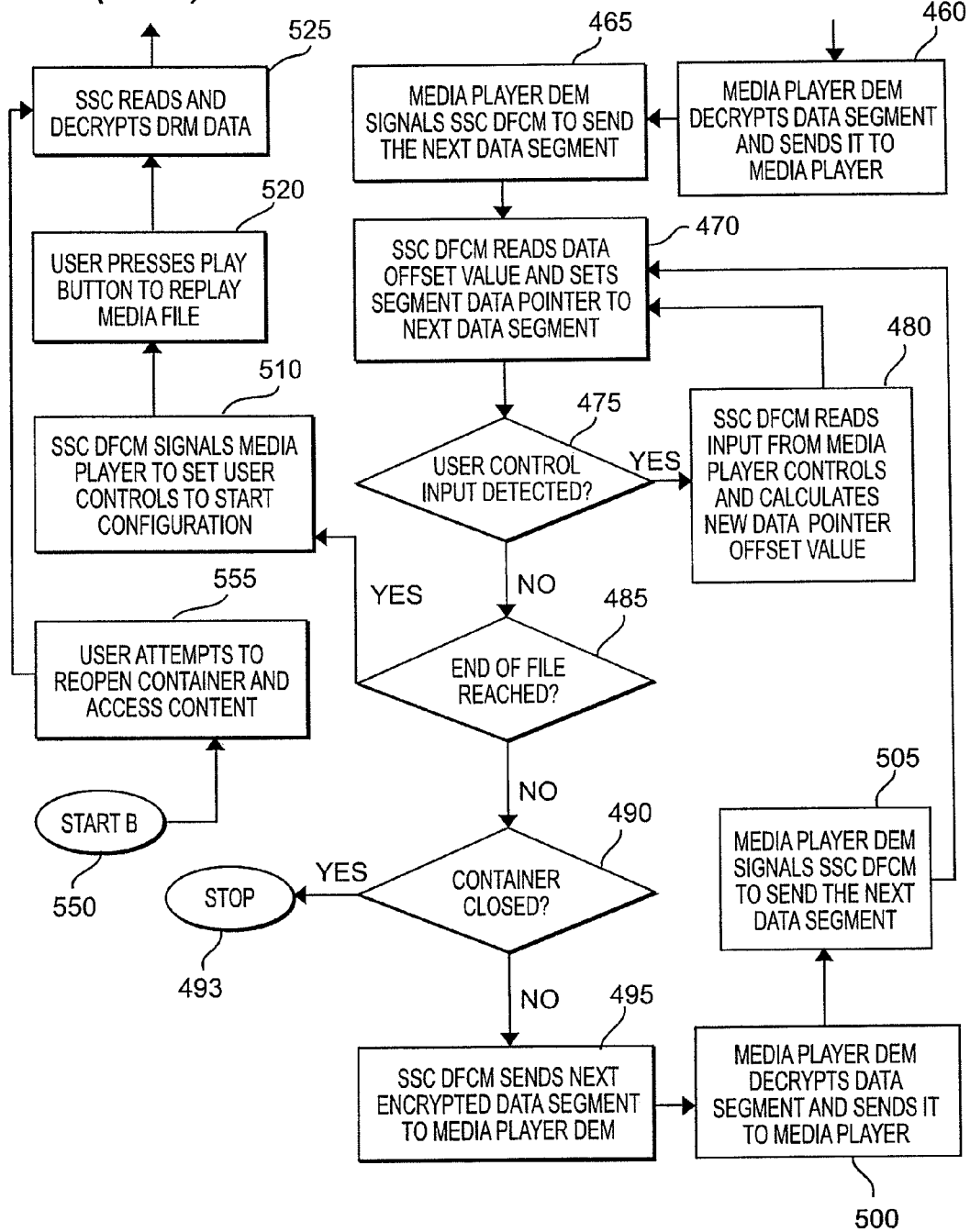

FIG. 8B is a flow chart of an embodiment showing steps of using the invention. The steps may begin either at step 400 or step 550 depending on whether it is a first time access or a subsequent access, respectively. For a first time access, the process commences at step 400. At step 405, a secure streaming container (SSC) is delivered to a recipient user's device or machine, for example, by transmitting the SSC over a network or physical delivery. This may be in response to the recipient user requesting the contents associated with the SSC. The SSC contents may include any type of electronic media such as audio, text, video, animation, or the like.

At step 410, the recipient user gains access to the SSC through permission processes (e.g., passwords, a financial transaction, user IDs, company IDs, demographic information, or other identification including biometrics, including retina scans, fingerprints, physical characteristics, and the like) and begins an installation. At step 415, an encrypted DRM data (e.g., a flag or identifier) is written to a protected, confidential, or unpublished location on the user's device or machine. At step 420, the SSC opens and calls DFCM to scan for a resident player registered to play the content media of the SSC (e.g., by file type or other identifier). This DFCM module contains the intelligence related to the streaming process and controls other modules related to media file streaming.

At step 425, a check is made whether an appropriate player is found. If an appropriate media player is not found, at step 440, the DFCM opens the internal media player (i.e., sent in the SSC) and instructs it to wait for a data stream originating from the SSC. This is the most secure configuration of the secure streaming container, since all decryption and rendering takes place inside the SSC.

If, however, at step 425, an appropriate media player is found on the user's device or machine, then at step 430, the DFCM installs the appropriate media player plug-in file(s) in an appropriate location (either in the target device memory or maintained within the SSC environment) on the user's device or machine. The user's device or machine may include a cell phone, a personal data assistant (PDA), a personal computer, a computing device, a portable music player, a tablet computer, a cable modem, a satellite receiver, a television, and a cable television tuner. The media player plug-in allows the secure streaming container to communicate with the resident media player and is installed in one of two possible configurations. The configuration type is determined by the media file type that the SSC is carrying.

If the file type is a non-proprietary, such as mpeg or mp3, the file rendering module resident in the SSC contains the appropriate codec for that file. The file may be played with the Decryption Engine Module (DEM) and the rendering module remaining in the container (e.g., 320 and 325 of FIG. 4). In this case, the media player plug-in includes only the Interface Control Module (ICM) (e.g., 330 of FIG. 4). In this mode the SSC uses the resident media player only for the user control interface (e.g., 335 of FIG. 4).

If the media file type is proprietary, such as files that can only be decoded by a commercial media player such as the Windows Media Player™ or the RealOne Player™, the container rendering module does not contain the necessary codec. This may be reflective of the embodiment of FIG. 6, for example. The secure streaming container may then use the rendering module in the resident media player (e.g., 325 of FIG. 6). The media player plug-in may comprise the ICM and the DEM, (e.g., 320 and 330 of FIG. 6).

Once the media player configuration has been established, at step 435, the DFCM signals the operating system to open the resident media player and begins requesting data. At step 445, the DFCM evaluates the user's device and adjusts the data streaming parameters as required. (Step 445, may result after step 430 or step 440.) For example, since the DFCM is programmed to send the data segments to the media player in the most efficient manner possible, the DFCM evaluates parameters such as available device memory and data bus speed and calculates the data segment size that is best suited to the particular device.

To begin the streaming process, at step 450, the DFCM sets the data segment pointer to the beginning of the encrypted content data file and sets the data offset value to zero. The data segment pointer marks the current position in the data file and tells the DFCM which data segment to send out next. The data offset value is used to change the position of the data segment marker if any input is received from the media player user controls. An example of this is when the user changes the file position indicator of the media player.

At step 455, the DFCM then sends the first encrypted data segment to the DEM. At step 460, the DEM decrypts it and sends it to the media player rendering module. At step 465, the DEM then signals the DFCM that it is ready to receive the next encrypted data segment. At step 470, the DFCM reads the data offset value and sets the segment data pointer to next data segment. At step 475, a check is made whether there has been any user input to the player controls and increments the data segment pointer to the next data segment. If so, at step 480, the DFCM reads input from the media player controls and calculates a new data pointer offset value corresponding to the user's input. The process then returns to step 470

If there is no input at step 475, at step 485, a check is made for end-of-file. If not, then at step 490 a check is made whether the SSC is closed. If the SSC is closed, the process completes at step 493. If the SSC is not closed, at step 495, the DFCM sends the next encrypted segment to the media player's DEM. At step 500, the media player DEM decrypts the data segment and sends it to the media player. At step, 505, the media player signals the DFCM to send the next data segment. The process then returns to step 470.

If, at step 485, the end of the file is reached, then at step 510, the DFCM sets the player controls to the start position and waits for the user to optionally play the file again. At step 520, an indication is detected indicating the user is attempting to play the file again (e.g., by pressing a play button on a user interface). At step 525, the secure streaming container reads and decrypts the digital rights management data for the container. (Alternatively, if the user closes the container, the process ends.) Access to step 525 may also be gained when a subsequent access is attempted, which, in this instance, the flow begins at step 550. At step 555, a user attempts to re-open a container and access the contents.

At step 530, a check is made to determine if the access rights allow the user to replay the file, and if so, the process continues with step 450. If, however, the access rights do not allow the file to be replayed, then at step 535, the SSC notifies the user that the access rights have expired and, at step 410, the user is then prompted to execute another transaction to regain access to the contents of the container.

During the streaming process, the secure streaming container acts as if it were a traditional streaming media server. But since the processing of the electronic media or data contained in the SSC is performed locally within a user's device or machine, no communication interference typically associated with traditional streaming techniques over networks are present. That is, no delays, pauses, interruptions or drop-outs occur due to delivery of electronic content streamed over networks or congestion, down-time, or overload problems with a server. These undesirable effects are avoided by the invention. Also, the user's player device is unable to differentiate between the secure streaming container of the invention and a traditional streaming server located remotely on the Internet, local or wide area network, wireless network, and the like. As a positive result, the user consistently experiences high quality, interruption free media file playback without a necessity for Internet access (or similar communication access) each time a playback is desired.

Additionally, the media file is decrypted and sent to the media player data segment by data segment, such that the file (i.e., electronic media content) is never written to the user's device hard drive in either encrypted or decrypted format and therefore is virtually completely invulnerable to unauthorized decryption or copying. In this manner, streaming media and other electronic content may be securely provided to consumers with high confidence that the delivery mechanism protects and controls access to the electronic media without compromising ownership and privacy goals of the electronic content.

While the invention has been described in terms of embodiments, those skilled in the art will recognize that the invention can be practiced with modifications and in the spirit and scope of the appended claims.

We claim:

1. A method of receiving electronic data, comprising the steps of:
    sending a secured streaming container (SSC) having streaming media content to a device;
    receiving data which is unique to the device at a verification server;
    combining the received data and a digital container identification data previously registered to produce a permission token;
    sending the permission token to the device,
    wherein the reception of the permission token results in rekeying an original key sent with the SSC using the permission token to securely rekey the streaming media content so that decrypting the streaming media content is locked to the device, and
    wherein access to the SSC acquires portions of the streaming media content while other portions of the streaming media content remain secure in the SSC.

2. The method of claim 1, further comprising playing at the device the portions of the streaming media content while other portions remain secured in the SSC.

3. The method of claim 1, wherein the SSC includes digital rights management (DRM) which controls the access to the SSC.

4. The method of claim 1, wherein the device includes at least one of a cell phone, a personal data assistant (PDA), a personal computer, a computing device, a portable music player, a tablet computer, a cable modem, a cable television tuner, and a satellite receiver.

5. The method of claim 1, wherein at least some of the content of the SSC is configured to execute within the environment of the device.

6. The method of claim 1, further comprising the step of obtaining permission to access the SSC.

7. The method of claim 6, wherein the obtaining permission includes at least one of (i) verifying a password, (ii) gathering demographic data, (iii) gathering personal data, (iv) gathering of device identification data, (v) processing a subscription transaction, and (vi) processing a financial transaction.

8. The method of claim 7, wherein the personal data includes at least one of a user identification (ID), a company ID, and a biometric data.

9. The method of claim 7, wherein the device identification data includes at least one of an input from a removable storage media and an input provided from a secure device attached to the device.

10. The method of claim 1, further including encrypting the SSC.

11. The method of claim 10, wherein the encrypting includes compressing the streaming media content.

12. The method of claim 10, further including encoding the streaming media content as a hyper-text markup language (html) file.

13. The method of claim 1, further including the step of downloading a java applet to the device in order to read the SSC content.

14. The method of claim 1, further comprising the step of verifying a password for a subsequent SSC access.

15. A computer program product comprising a computer usable recording medium having readable program code embodied in the medium, the computer program product includes at least one component to:
    send a secured streaming container (SSC) having streaming media content to a device; and
    send data uniquely associated with the device to a verification server;
    combine the data and a digital container identification data previously registered with the verification server to produce a permission token,
    send the permission token to the device, and
    wherein the reception of the permission token results in rekeying an original key sent with the SSC using the permission token to securely rekey the streaming media content so that decrypting the streaming media content is locked to the device.

16. The computer program product of claim 15, wherein the at least one component is configured to play portions of the streaming media content while other portions remain secure in the SSC.

17. The computer program product of claim 15 wherein at least some of the content of the SSC is configured to execute within the environment of the device.

18. The computer program product of claim 15, wherein the device includes at least one of a cell phone, a personal data assistant (PDA), a personal computer, a computing device, a portable music player, a tablet computer, a cable modem, a television, a cable television tuner, and a satellite receiver.

19. The computer program product of claim 15, wherein the at least one component provides permission to access the SSC.

20. The computer program product of claim 15, wherein the permission is obtained using at least one of (i) verifying a password, (ii) demographic data, (iii) personal data, (iv) device identification data, (v) processing a subscription transaction, and (vi) processing a financial transaction.

21. The computer program product of claim 20, wherein the device identification data includes at least one of an input from a removable storage media and an input provided from a secure device attached to the device.

22. The computer program product of claim 15, wherein the at least one component:
    detects an attempt to access the SSC;
    determines if permission has been previously granted to open the SSC and, if not,
    supplies transaction information;
    sends the transaction information to a digital container verification server in an encrypted session and the digital container verification server sends a permission token back to the SSC; and
    the at least one component grants permission to open the SSC.

23. The computer program product of claim 22, wherein the transaction information includes at least one of a financial information, a personal data, and a demographic data.

24. The computer program product of claim 15, wherein the at least one component plays the streaming media content from a location on the device so that the streaming media content plays without interruption avoiding network connectivity delays and disruptions.

* * * * *